United States Patent
Xiao et al.

(10) Patent No.: US 10,095,402 B2
(45) Date of Patent: Oct. 9, 2018

(54) METHOD AND APPARATUS FOR ADDRESSING TOUCH DISCONTINUITIES

(71) Applicant: QEEXO, CO., San Jose, CA (US)

(72) Inventors: Robert Xiao, Pittsburgh, PA (US); Julia Schwarz, Pittsburgh, PA (US); Christopher Harrison, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 0 days.

(21) Appl. No.: 14/503,894

(22) Filed: Oct. 1, 2014

(65) Prior Publication Data

US 2016/0098185 A1 Apr. 7, 2016

(51) Int. Cl.
*G06F 3/044* (2006.01)
*G06F 3/0488* (2013.01)
(Continued)

(52) U.S. Cl.
CPC ........ *G06F 3/04883* (2013.01); *G06F 3/0416* (2013.01); *G06K 9/00416* (2013.01); *G06K 9/44* (2013.01); *G06K 9/4604* (2013.01)

(58) Field of Classification Search
CPC ...... G06F 3/0416; G06F 3/0412; G06F 3/041; G06F 3/0488; G06F 3/04883
See application file for complete search history.

(56) References Cited

U.S. PATENT DOCUMENTS

| 4,561,105 A | 12/1985 | Crane et al. |
| 4,686,332 A * | 8/1987 | Greanias ............... G06F 3/044 345/173 |

(Continued)

FOREIGN PATENT DOCUMENTS

| JP | 2004-213312 A | 7/2004 |
| KR | 10-2002-0075283 A | 10/2002 |

(Continued)

OTHER PUBLICATIONS

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.

(Continued)

*Primary Examiner* — Olga Merkoulova
(74) *Attorney, Agent, or Firm* — IPV Law Group; David N. Tran

(57) ABSTRACT

Systems and methods are provided that determine when an initial stroke and a subsequent stroke track may be part of a common user input action. A method may include receiving a signal from which an initial stroke track representing an initial movement of a user controlled indicator against a touch sensitive surface and sensing a subsequent stroke track representing subsequent movement of the user controlled indicator against the touch sensitive surface can be determined. The method further includes determining that the initial stroke track and the subsequent stroke track comprise portions of common user input action when the initial stroke track is followed by the subsequent stroke track within a predetermined period of time and a trajectory of the initial stroke track is consistent with a trajectory of the subsequent stroke track.

35 Claims, 16 Drawing Sheets

(51) Int. Cl.
  *G06F 3/041* (2006.01)
  *G06K 9/00* (2006.01)
  *G06K 9/44* (2006.01)
  *G06K 9/46* (2006.01)

(56) References Cited

U.S. PATENT DOCUMENTS

| | | | |
|---|---|---|---|
| 5,596,656 A | 1/1997 | Goldberg | |
| 5,615,285 A | 3/1997 | Beernink | |
| 5,666,438 A | 9/1997 | Beernink et al. | |
| 5,933,514 A | 8/1999 | Ostrem et al. | |
| 6,212,295 B1 | 4/2001 | Ostrem et al. | |
| 6,252,563 B1* | 6/2001 | Tada | G06F 3/038 178/18.01 |
| 7,098,896 B2 | 8/2006 | Kushler et al. | |
| 9,013,452 B2 | 4/2015 | Harrison et al. | |
| 9,019,244 B2 | 4/2015 | Harrison | |
| 2002/0009227 A1 | 1/2002 | Goldberg et al. | |
| 2002/0057837 A1 | 5/2002 | Wilkinson et al. | |
| 2005/0083313 A1* | 4/2005 | Hardie-Bick | G06F 3/0433 345/177 |
| 2010/0271322 A1* | 10/2010 | Kondoh | G06F 3/0416 345/173 |
| 2010/0309158 A1* | 12/2010 | Iwayama | G06F 1/1643 345/173 |
| 2011/0018825 A1* | 1/2011 | Kondo | G06F 3/0433 345/173 |
| 2013/0014248 A1* | 1/2013 | McLaughlin | H04L 63/083 726/17 |
| 2014/0007002 A1* | 1/2014 | Chang | G06F 3/04883 715/780 |

FOREIGN PATENT DOCUMENTS

| | | |
|---|---|---|
| WO | 1994004992 A1 | 3/1994 |
| WO | 2006-070044 A1 | 7/2006 |
| WO | 2013059488 A1 | 4/2013 |

OTHER PUBLICATIONS

Benko, Hrvoje, Wilson, Andrew, Balakrishnan, Ravin; Sphere: Multi-Touch Interactions on a Spherical Display; Proceedings of UIST, 2008; pp. 77-86; 2008.

Burges, Christopher; A Tutorial on Support Vector Machines for Pattern Recognition; Data Mining and Knowledge Discovery, 2; pp. 121-167; 1998.

Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (Tabletop); pp. 139-146; 2008.

Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.

Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.

Dietz, Paul, Leigh, Darren; DiamondTouch: A Multi-User Touch Technology; ACM Symposium on User Interface Software & Technology (UIST); pp. 219-226; 2001.

Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.

Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.

Harrison, Chris, Tan, Desney, Morris, Dan; Skinput: Appropriating the Body as an Input Surface; Proceedings of CHI, 2010; pp. 453-462; 2010.

Harrison, Chris, Hudson, Scott; Scratch Input: Creating Large, Inexpensive, Unpowered and Mobile Finger Input Surfaces; Proceedings of UIST, 2008; pp. 205-208; 2008.

Hartmann, Bjorn, Ringel Morris, Meredith, Benko, Hrvoje, Wilson, Andrew; Augmenting Interactive Tables with Mice & Keyboards; Proceedings of UIST, 2009; pp. 149-152; 2009.

Hinckley, Ken, Song, Hyunyoung; Sensor Synaesthesia: Touch in Motion, and Motion in Touch; Proceedings of CHI, 2011; pp. 801-810; 2011.

Hinckley, Ken, Yatani, Koji, Pahud, Michel, Coddington, Nicole, Rodenhouse, Jenny, Wilson, Andy, Benko, Hrvoje, Buxton, Bill; Pen + Touch = New Tools; Proceedings of UIST, 2010; pp. 27-36; 2010.

Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of CHI, 2010; pp. 2793-2802; 2010.

Holz, Christian, Baudisch, Patrick; The Generalized Perceived Input Point Model and How to Double Touch Accuracy by Extracting Fingerprints; Proceedings of CHI, 2010; pp. 581-590; 2010.

Kaltenbrunner, Martin, Bencina, Ross; reacTIVision: A Computer-Vision Framework for Table-Based Tangible Interaction; Proceedings of TEI, 2007; pp. 69-74; 2007.

Matsushita, Nobuyuki, Rekimoto, Jun; HoloWall: Designing a Finger, Hand, Body, and Object Sensitive Wall; Proceedings of UIST, 1997; pp. 209-210; 1997.

Mimio; http://www.mimio.com.

Olwal, Alex, Wilson, Andrew; SurfaceFusion: Unobtrusive Tracking of Everyday Objects in Tangible User Interfaces; Proceedings of GI, 2008; pp. 235-242; 2008.

Paradiso, Joseph, Leo, Che King; Tracking and Characterizing Knocks Atop Large Interactive Displays; Sensor Review, 25(2); pp. 134-143; 2005.

Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.

Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.

Rekimoto, Jun, Saitoh, Masanori; Augmented Surfaces: A Spatially Continuous Work Space for Hybrid Computing Environments; Proceedings of CHI, 1999; pp. 378-385; 1999.

Rekimoto, Jun, Sciammarella, Eduardo; ToolStone: Effective use of the Physical Manipulation Vocabularies of Input Devices; Proceedings of UIST, 2000; pp. 109-117; 2000.

Rekimoto, Jun; SmartSkin: An Infrastructure for Freehand Manipulation on Interactive Surfaces; Proceedings of CHI, 2002; pp. 113-120; 2002.

Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.

Wang, Feng, Ren, Xiangshi; Empirical Evaluation for Finger Input Properties in Multi-Touch Interaction; Proceedings of CHI, 2009; pp. 1063-1072; 2009.

International Search Report and Written Opinion for PCT/US2012/060865; dated Mar. 29, 2013.

Non-Final Office Action—dated Mar. 13, 2015—U.S. Appl. No. 13/958,427, filed Mar. 23, 2013, titled: "Capture of Vibro-Acoustic Data Used to Determine Touch Types".

Final Office Action—dated Jun. 19, 2015—U.S. Appl. No. 13/958,427, filed Mar. 23, 2013, titled: "Capture of Vibro-Acoustic Data Used to Determine Touch Types".

Non-Final Office Action—dated Apr. 6, 2015—U.S. Appl. No. 13/887,711, filed May 6, 2013, titled: "Using Finger Touch Types To Interact With Electronic Devices".

Final Office Action—dated Aug. 7, 2015—U.S. Appl. No. 14/191,329, filed Feb. 26, 2014, titled: "Using Capacitive Images for Touch Type Classification".

Non-Final Office Action—dated Oct. 1, 2015—U.S. Appl. No. 14/492,604, filed Sep. 22, 2014, titled: "Method and Apparatus for Improving Accuracy of Touch Screen Event Analysis by Use of Edge Classification".

(56) References Cited

OTHER PUBLICATIONS

International Search Report and Written Opinion received for PCT Application No. PCT/US2014/049485 dated Nov. 17, 2014.
International Search Report and Written Opinion received for PCT Application No. PCT/US2014/033380 dated Mar. 13, 2015.
International Search Report and Written Opinion received for PCT Application No. PCT/US2014/034977 dated Sep. 18, 2014.
Non-Final Office Action—dated Oct. 7, 2015—U.S. Appl. No. 14/495,041, filed Sep. 24, 2014, titled: "Method for Improving Accuracy of Touch Screen Event Analysis by Use of Spatiotemporal Touch Patterns".
Non-Final Office Action—dated Oct. 2, 2015—U.S. Appl. No. 14/486,800, filed Sep. 15, 2014, titled: "Method and Apparatus for Resolving Touch Screen Ambiguities".
Swype Basics, website link: www.swype.com/tips/swype-basics, Retrieved date: Jul. 18, 2014, 2 pages.
Swype Tips, website link: www.swype.com/category/tips, Retrieved date: Jul. 18, 2014, 1 page.
Swype Advanced Tips, website link: www.swype.com/tips/advanced-tips, Retrieved date: Jul. 18, 2014, 2 pages.
Swype Advanced Tips, Jul. 18, 2014, http://www.swype.com/tips/advanced-tips, 2 pages.
Swype Basics, Jul. 18, 2014, http://www.swype.com/tips/swype-basics, 2 pages.
Swype Tips, Jul. 18, 2014, http://www.swype.com/category/tips, 1 page.
Non-Final Office Action—dated Dec. 18, 2015—U.S. Appl. No. 14/483,150, filed Sep. 11, 2014, titled: "Method and Apparatus for Differentiating Touch Screen Users Based on Touch Event Analysis".
Non-Final Office Action—dated Jan. 29, 2016—U.S. Appl. No. 14/219,919, filed Mar. 19, 2014, titled: "Method and Device for Sensing Touch Inputs".
Non-Final Office Action—dated Nov. 5, 2015—U.S. Appl. No. 13/887,711, filed May 6, 2013, titled: "Using Finger Touch Types to Interact With Electronic Devices".
Final Office Action--mailed on Feb. 24, 2016—U.S. Appl. No. 13/887,711, filed May 6, 2013, titled: "Using Finger Touch Types to Interact With Electronic Devices".
International Search Report and Written Opinion for PCT/US2015/051355; dated Dec. 15, 2015.
International Search Report and Written Opinion for PCT/US2015/047428; dated Nov. 27, 2015.
International Search Report and Written Opinion for PCT/US2015/050570; dated Dec. 17, 2015.
International Search Report and Written Opinion for PCT/US2015/014581; dated May 14, 2015.

\* cited by examiner

METHOD AND APPARATUS FOR ADDRESSING TOUCH DISCONTINUITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the field of touch screen technology and more particularly to determining user inputs based upon touch sensing.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Touch sensitive devices such as touch screen displays, track pads and graphic tablets have a touch sensitive surface that can sense when a user of the touch screen device brings an object such as a fingertip into contact with a portion of the touch sensitive surface and that sends signals to a processor from which the processor can determine which portion of the touch sensitive surface sensing surface has been contacted. By monitoring the signals from the touch sensitive surface over time, it is possible to assemble tracking data characteristic of a path of movement of the object from a moment of that the object contacts with the touch sensitive surface until the object separates from touch sensitive surface.

Conventionally, such a movement is referred to as a stroke. It will be appreciated that processing user input on a stroke by stroke basis offers many advantages. One advantage is that stroke type movements such as finger pointing, gesticulation and handwriting are used to convey information in a whole host of human interactions. By sensing gestures of this type, touch sensitive surfaces allow more natural interactions between users and touch sensitive devices thereby increasing the usability and adoption rate of such devices while lowering training costs.

SUMMARY

Methods and systems are provided for determining when an initial stroke track and a subsequent stroke tracks are from a common user input action. In one embodiment, a system has a sensor sensing an initial stroke track representing an initial movement of a user controlled indicator against a touch sensitive surface and sensing a subsequent stroke track representing subsequent movement of the user controlled indicator against the touch sensitive surface; and a processor receiving the signal and determining that the initial stroke track and the subsequent stroke track comprise portions of common user input action when the initial stroke track is followed by the subsequent stroke track within a continuity time range and a trajectory of the initial stroke track is consistent with a trajectory of the subsequent stroke track.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
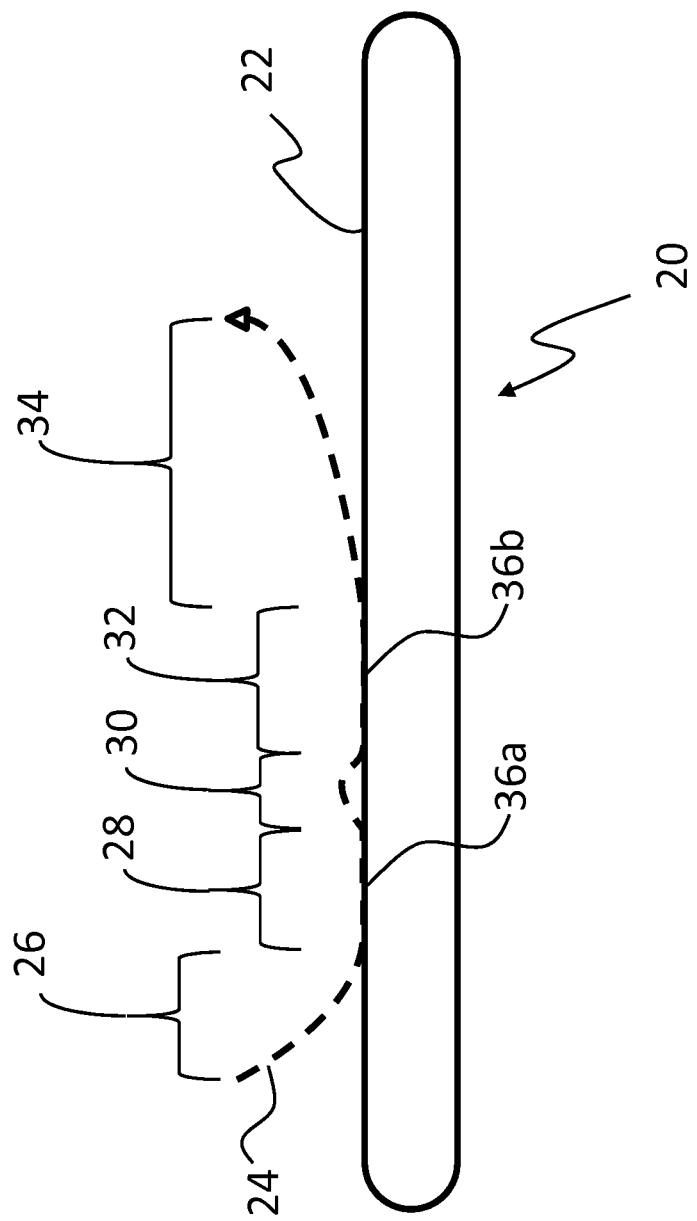
FIG. 1 shows a side elevation view of a touch sensitive device having a touch sensitive surface and a finger trajectory. Finger trajectory depicts a path of a fingertip used to form a stroke on surface and illustrates an example of a lift discontinuity.

Applications of methods and apparatus according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include a system for determining when an initial stroke track and a subsequent stroke tracks are from a common user input action. The system may include a sensor configured to sense an initial stroke track representing an initial movement of a user controlled indicator against a touch sensitive surface and to sense a subsequent stroke track representing subsequent movement of the user controlled indicator against the touch sensitive surface. The system also include a processor configured to receive the signal and to determine that the initial stroke track and the subsequent stroke track comprise portions of common user input action when the initial stroke track is followed by the subsequent stroke track within a continuity time range and a trajectory of the initial stroke track is consistent with a trajectory of the subsequent stroke track.

The disclosed embodiments may include a method for continuity determination. In this method, a signal is received from which initial stroke track representing an initial movement of a user controlled indicator against a touch sensitive surface and a subsequent stroke track representing subsequent movement of the user controlled indicator against the touch sensitive surface can be determined and it is determined the initial stroke track and the subsequent stroke track comprise portions of common user input action when the initial stroke track is followed by the subsequent stroke track within a predetermined period of time and a trajectory of the initial stroke track is consistent with a trajectory of the subsequent stroke track.

The disclosed embodiments may include may include a computer-readable recording medium having program instructions that can be executed by various computer components to perform a method with the method comprising receiving a signal from which an initial stroke track representing an initial movement of a user controlled indicator against a touch sensitive surface and sensing a subsequent stroke track representing subsequent movement of the user controlled indicator against the touch sensitive surface can be determined and determining that the initial stroke track and the subsequent stroke track comprise portions of common user input action when the initial stroke track is followed by the subsequent stroke track within a predetermined period of time and a trajectory of the initial stroke track is consistent with a trajectory of the subsequent stroke track.

In general, a touch sensitive device can use a touch sensitive surface to sense strokes that are intended to represent alpha/numeric characters. For example, U.S. Pat. No. 5,596,656 describes a system in which text is written using symbols that are exceptionally well separated from each other graphically. These symbols preferably define an orthographic alphabet to reduce the time and effort that is required to learn to write text with them at an acceptably high rate. Furthermore, to accommodate "eyes-free" writing of text and the writing of text in spatially constrained text entry fields, the symbols advantageously are defined by single unbroken strokes or unistrokes. Accordingly, in unistroke interpretation each single unbroken track of movement against the touch sensitive screen is interpreted as a separate stroke and interpreted by comparing the stroke to a limited set of unistroke characters. Unistroke interpretation of each stroke greatly simplifies the task of automatically interpreting each sensed stroke as the interpretation algorithm is not required to process combinations of preceding and following strokes and need only compare each individual stroke to limited set of options.

A variant of the unistroke interpretation, known as the "Jot" handwriting recognition system, used a combination of unistroke and two-stroke characters to define individual characters. This system was incorporated into software sold by Palm Computing in various models of personal digital assistants introduced in 2003 under the brand name "Graffiti 2 Powered by Jot". Jot advantageously used a two stroke approach to form characters using two step mechanics that more closely approximated conventional handwriting mechanics such as requiring two intersecting lines to form characters such as "x", "t" and "k" and requiring the dotting of the letter "i". Here the limited additional processing burden of processing a limited set of two-stroke characters is accepted in favor of allowing users to form certain characters in a way that is more consistent with conventional handwriting strokes.

More recently, the unistroke interpretation of strokes has also been applied in the task of inputting alpha numeric text on a touch sensitive screen having a virtual keyboard. For example, U.S. Pat. No. 7,098,896 describes a touch sensitive device that presents a virtual keyboard that includes a set of keys where each letter of alphabet is associated with at least one key. In a device that uses the '896 patent, a user traces a unistroke input pattern by moving a finger or other indicator from a position that is at or near a first letter in a word to be written and then tracing along the keyboard positions at or near each letter of the decided word in sequence. A list of possible words associated with the entered part trace is generated and presented to the user for selection. Accordingly, in this approach a unistroke interpretation is not used to identify strokes that form an individual character in a word but rather to select likely words based upon a path across the virtual keyboard from a first letter in a word to a last letter in the word. A similar approach is described in U.S. Pat. No. 7,250,938.

Unistroke interpretation of sensed patterns of touch movement can be usefully applied for other purposes. These include receiving and processing graphic markings, user input actions, as conventional mouse/stylus interactions or more complex multi-touch user input actions. Here too the unistroke interpretation simplifies processing.

It will be appreciated from the foregoing that unistroke interpretation requires accurate sensing of the stroke made by the user. This in turn requires accurate sensing of where a stroke begins, where a stroke ends and the path of movements therebetween. However, in some circumstances, a portion of a stroke is not sensed or is otherwise not understood to be part of an intended stroke. This is known as a discontinuity.

In some cases, a discontinuity arises because contact is not maintained with the touch sensitive device for the duration of the stroke. One example of this is a lift discontinuity, which occurs when a finger or stylus is momentarily lifted from contact with the touch sensitive surface as the finger or stylus is moved.

FIG. 1 illustrates an example of a lift discontinuity. FIG. 1 shows a side elevation view of a touch sensitive device 20 having a touch sensitive surface 22 and a finger trajectory 24. Finger trajectory 24 depicts a path of a fingertip used to form a stroke on surface 22. As is shown the embodiment of FIG. 1, during an approach phase 26, the fingertip is moved along a trajectory from a position separate from surface 22 of touchscreen device 20 into a position that is in contact with contact surface 22 to begin a stroke. During first contact segment 28 of finger trajectory 24, the fingertip is maintained in contact with touch sensitive surface 22. However, during a lift segment 30 of finger trajectory 24, the fingertip separates from touch sensitive surface 22 of touch sensitive device 20. Contact between the fingertip and touch sensitive surface 22 is reestablished during a second contact segment 32 of finger trajectory 24 and ends at the start of a removal phase 34 where fingertip trajectory 24 is pulled away from touch sensitive surface 22.

Conventionally separate data sets characterizing strokes 36a and 36b are then each prepared, each with a unique identification, separate stroke tracking data and individual metadata. These data sets are then interpreted independently using unistroke interpretation. However this does not yield an outcome that represents the intention of the user of touch sensitive system 20 and may create two errors that must be corrected. Additionally, after such corrections are made, finger trajectory 24 must be repeated without a lift.

Figure 2:
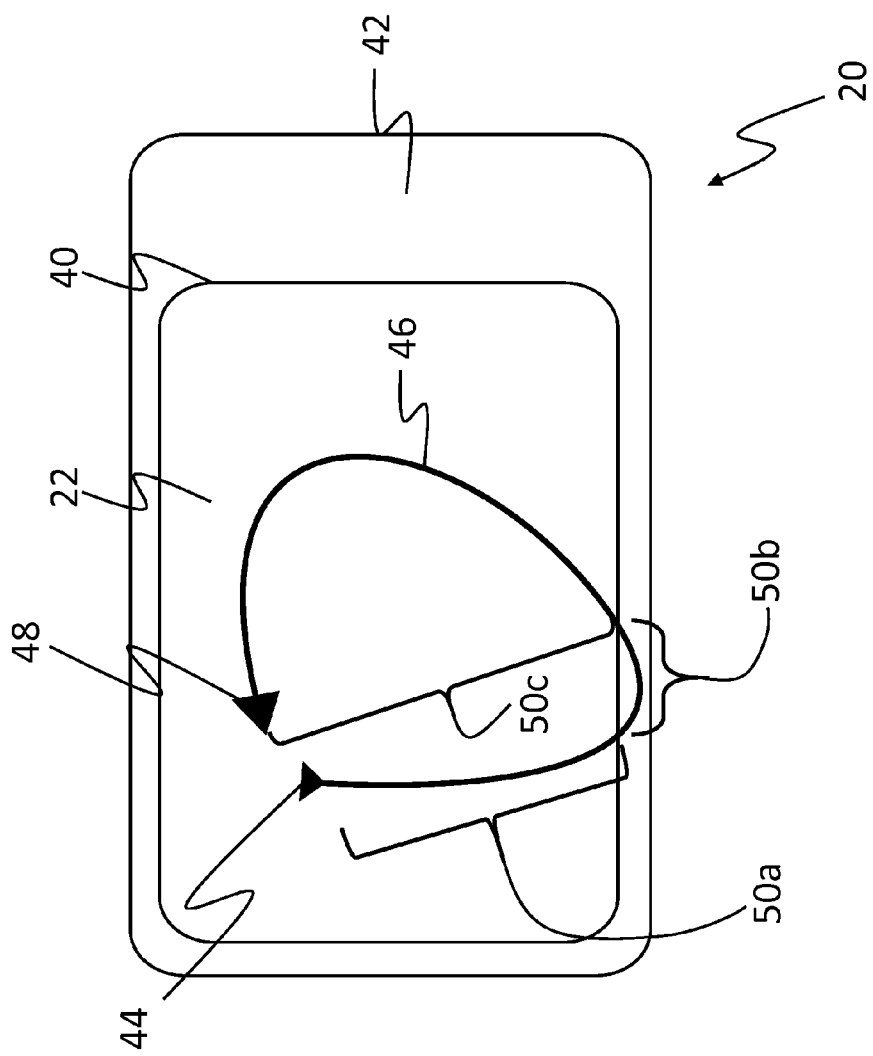
FIG. 2 shows a top view of a touch sensitive device having a touch sensitive surface with a perimeter bordered by a bezel area that is not touch sensitive and illustrates a second example of a touch discontinuity in a touch sensitive device.

FIG. 2 shows a top view of a touch sensitive device 20 having a touch sensitive surface 22 with a perimeter 40 bordered by a bezel area 42. Bezel area 34 is not touch sensitive. In this example, a fingertip is brought into contact with touch sensitive surface 22 at an initial contact position 44 and moved along a roughly circular fingertip trajectory 46 to an end contact position 48. As is illustrated in FIG. 2, a first segment 50a of fingertip trajectory 46 extends from initial contact position 44 to perimeter 40 of touch sensitive surface 22, a second segment 50b of fingertip trajectory 42 that begins when fingertip trajectory 46 leaves perimeter 40 and ends when fingertip trajectory 46 returns inside perimeter 40 and a third segment 50c of fingertip trajectory 42 begins as fingertip trajectory 46 reenters perimeter 40 and ends at end contact position 48.

Here too, in a conventional approach, first segment 50a is identified as a first stroke and third segment 50c is a second stroke and separate data sets characterizing first segment 50a and third segment 50c are then each prepared, each with a unique identification, separate stroke tracking data and individual metadata. These data sets are then interpreted independently using unistroke interpretation. This similarly produces an erroneous outcome that can create two errors that must be corrected and, in addition, require finger trajectory 46 to be repeated within the confines of perimeter 40.

Figure 3:
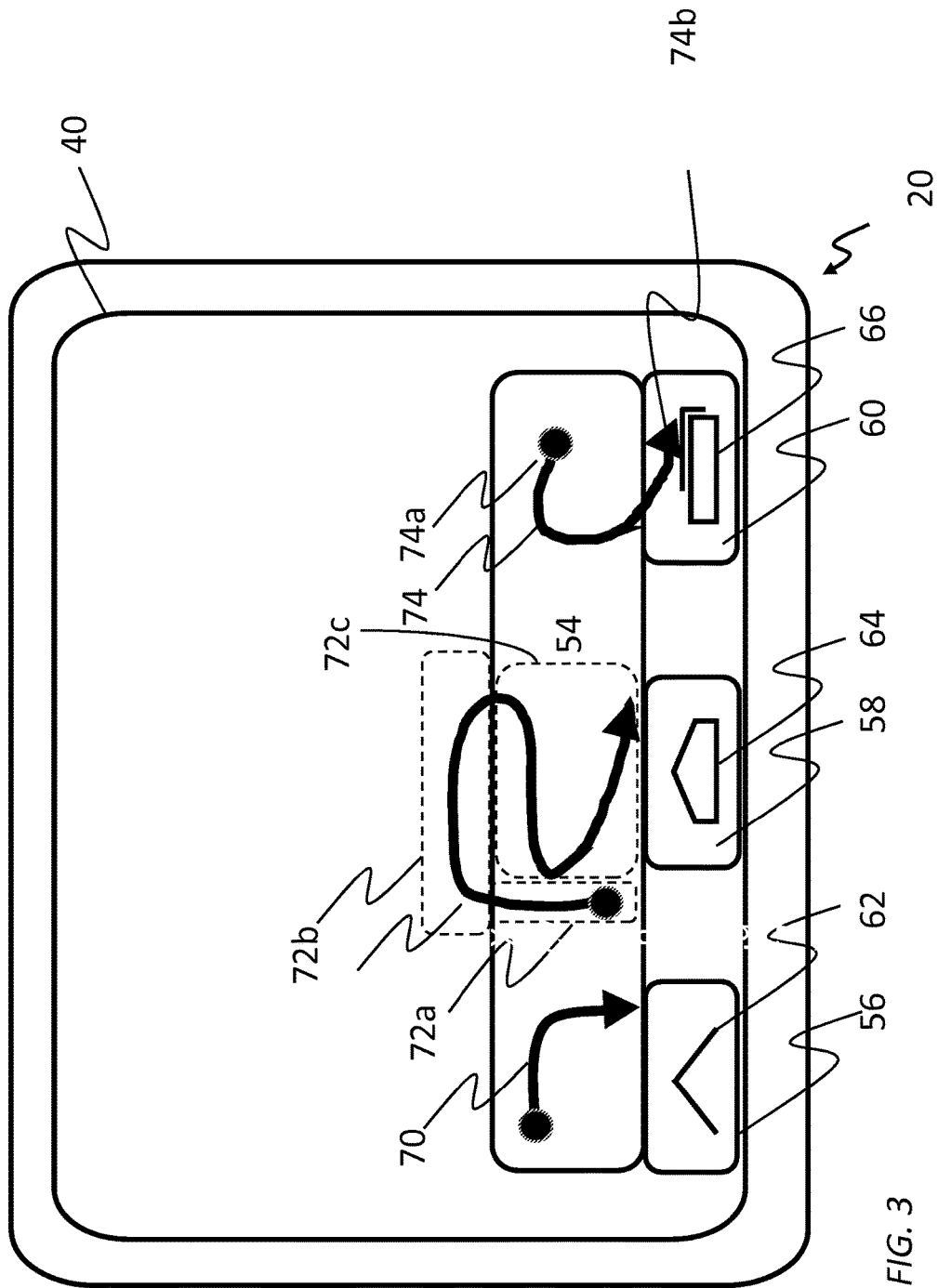
FIG. 3 shows a top view of a touch sensitive surface having a spatially constrained text entry field in a first and various finger traces provided on the touch sensitive surface.

FIG. 3 illustrates yet another example of a discontinuity that can occur in a touch sensitive device 20. In this example, touch sensitive surface 22 is sensitive to touch at any point within perimeter 40, however in this embodiment, a spatially constrained text entry field is provided in a first portion 54 of touch sensitive surface 22. When a user forms the entire pattern such as example first 70, this system works as anticipated. However, when a segment of a stroke extends beyond first portion 54 unintended outcomes are possible. One example of this is illustrated in FIG. 3 in which a second stroke 72 has a first segment 72a within first portion 54, a second segment 72b that is outside of first portion 54 and a third segment 72c that is within first portion 54. Here too a conventional stroke based analysis can determine that two strokes have been made: a first stroke 72a and a second stroke 72c.

Other unintended effects are possible. For example, in the example illustrated in FIG. 3, second portion 56, third portion 58 and fourth portion 60 of touch sensitive surface 22 are associated with a back symbol 62, a home symbol 64 and a running apps symbol 66 respectively. In the example of FIG. 3, third stroke 74 has a first segment 74a that is within first portion 54 however a second segment 74b trails into portion 60. This launches a running app routine that can disrupt the user input action being undertaken by the user in first portion 54.

What are needed in the art are systems and methods for touch screen interpretation that are tolerant to and correctly interpret user input actions even when the sensing of the same has disruptions therein.

One effort to meet this need can be found in swipe keyboard software sold by Nuance Corporation, Burlington Mass., USA. In this software, strokes are created that travel from character to character a keyboard overlay that occupies a portion of touch sensitive display screen. When a stroke exceeds the boundary of the keyboard overlay activity that occurs outside of the keyboard overlay is ignored. However, so long as contact between the finger and the touch sensitive surface is maintained and the finger returns to the keyboard area. Accordingly, to the extent the user begins a stroke within the keyboard overlay portion screen and leaves the keyboard overlay portion to return to the keyboard overlay portion and continue with a stroke, stroke is considered to include all sensed movement of the indicator within the keyboard perimeter. This too can have unintended consequences and other approaches are needed.

Figure 4:
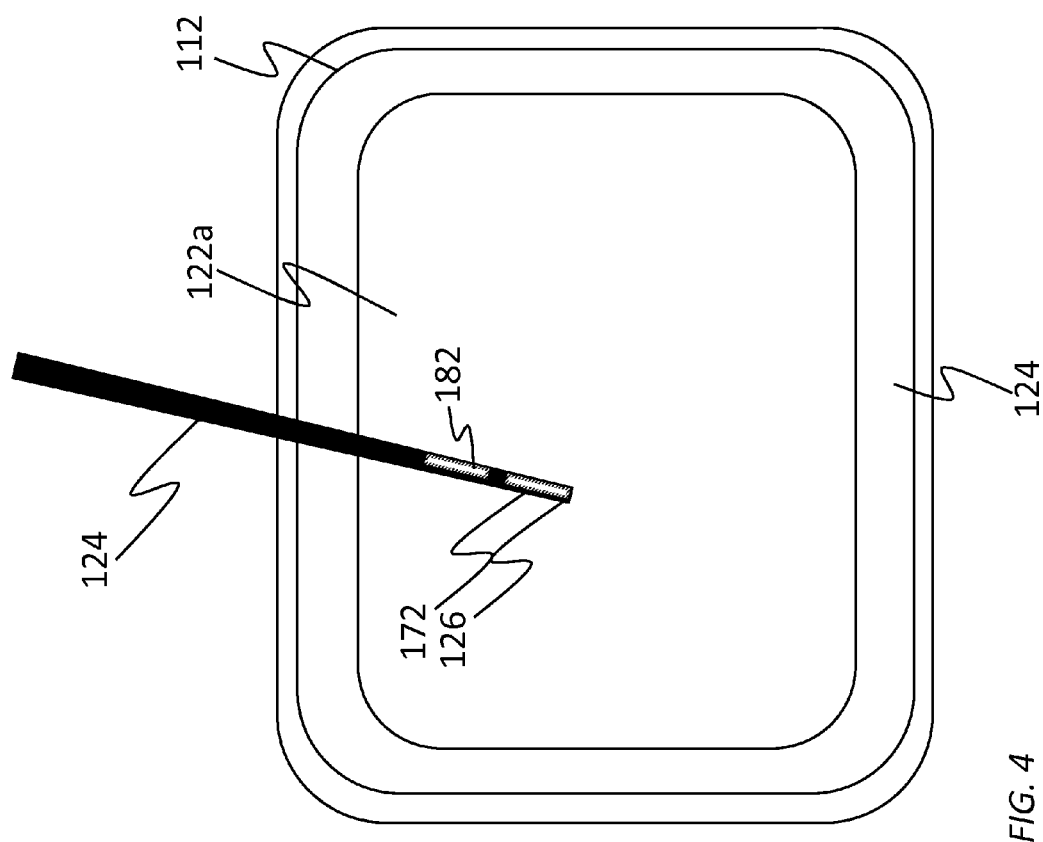
FIG. 4 shows top view of a first embodiment of touch sensitive system.
Figure 5:
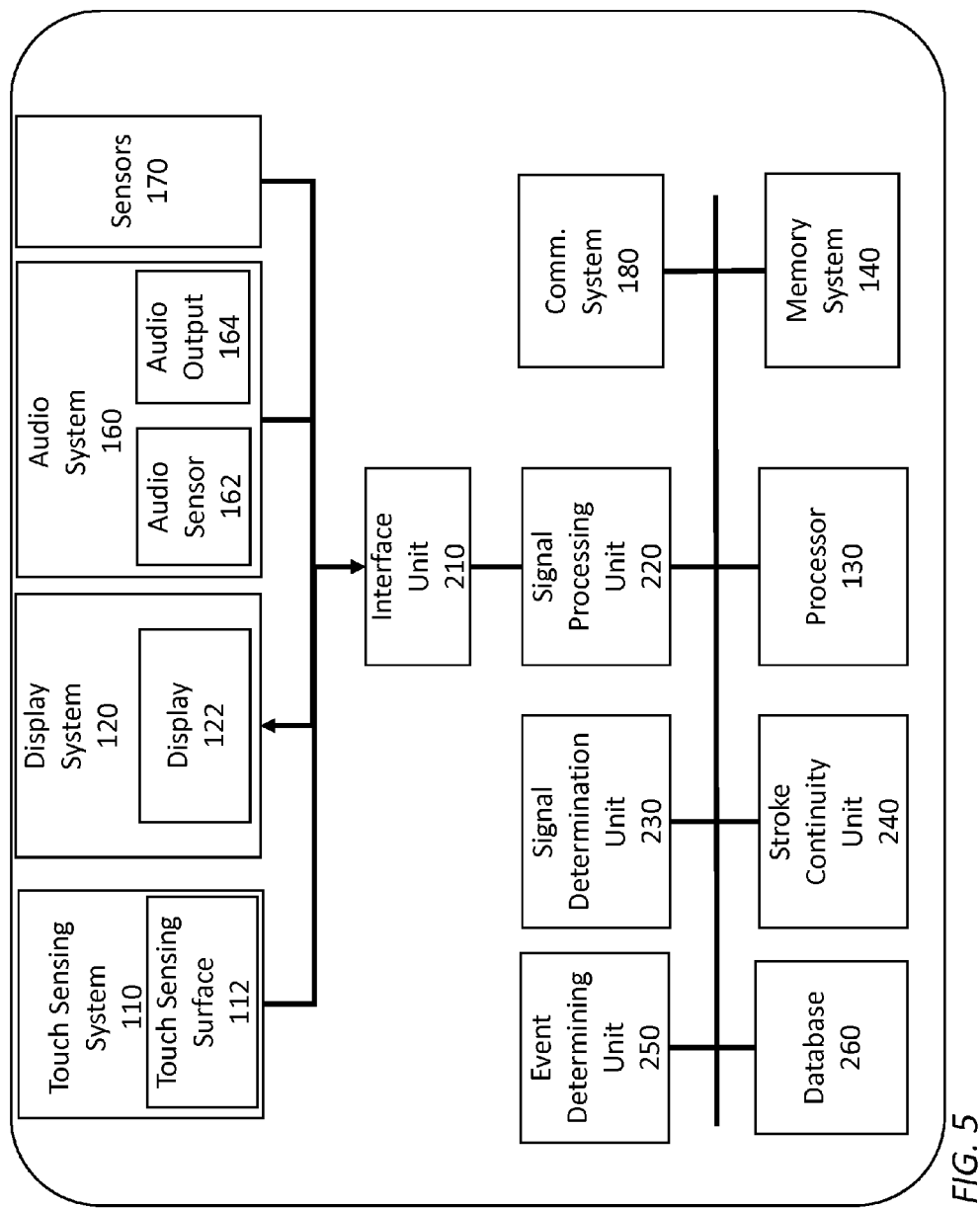
FIG. 5 is a block diagram of one embodiment of a touch sensitive system.

FIG. 4 shows an exterior view of a touch sensitive device 100 and FIG. 5 shows a block diagram of touch sensitive device 100 according to one embodiment of the present invention. In this embodiment, touch sensitive device 100 has a display area 110 that presents an image over a two-dimensional presentation area 112. In this embodiment, a touch sensing system 120 provides a touch sensitive surface 112 that is at least in part coextensive with presentation area 112. Touch sensitive surface 112 is adapted to detect when a tip 126 of an indicator 124 such as a fingertip or stylus is positioned by user within a range of sensing positions relative to the touch sensitive surface 112 and to generate a signal from which it can be determined which portion of touch sensitive surface 112 is in contact with indicator 124.

Touch sensitive device 100 of FIGS. 4 and 5 can take any of a variety of forms including as shown in FIG. 4, a smartphone. However, in other embodiments, touch sensitive device 100 can take other forms including but not limited to any type of digital equipment having a touch sensing system and a processor such as a micro-processor, micro-controller, or any other type of programmable control device, or a preprogrammed or dedicated processing or control system. Examples of such touch sensitive devices include desktop computers, notebook computers, workstations, PDAs, web pads, and mobile phones (other than smartphones). Similarly, touch sensitive device 100 can take other forms such as the forms of standalone touch pads and track pads as well as systems that incorporate touch sensitive surfaces and 22 such as touch pads, graphics tablets and track pads. In this regard, it will be appreciated that while the components of touch sensitive device 100 are illustrated as being within a single housing 102, this is optional, and these components may be located in separately housed components of touch sensitive device 100.

In the embodiment that is illustrated in FIGS. 4 and 5, touch sensitive device 100 has a touch sensing system 110 incorporating touch sensitive surface 112 that senses when an indicator 120 shown here as a stylus touches touch sensitive surface 110. Touch sensing system 110 generates signals from it can be determined which portion of touch sensitive surface 112 is in contact with indicator 120. A processor 130 receives the signals from touch sensing system 110 and analyzes the signals to detect strokes made by indicator 120 against touch sensitive surface 112.

In the embodiment illustrated in FIGS. 4 and 5, touch sensitive device 100 further has a memory system 140. Memory system 140 may be capable of providing programming and other forms of instructions to processor 130 and that can be used for other purposes. Memory system 140 may include read only memory, random access semiconductor memory or other types of memory or computer readable media that may be permanently installed or separably mounted to touch sensitive device 100. Additionally, touch sensitive device 100 may also access a memory system 140 that is separate from touch sensitive device 100 by way of an optional communication system 190.

Touch sensitive device 100 is also shown having other optional components such an audio system 160 having an audio sensor 162 such as a microphone and or connection to a microphone and an audio output 164 such as a speaker or connection to a speaker. Touch sensitive device 100 is also shown in this embodiment as having a memory system 140 and may include, as illustrated, a display system 120 with display 122, sensors 170, a communication system 190, an interface unit 210, a signal processing unit 220, a signal determination unit 230, and event determining unit 250 and a database 260.

Sensors 170 can take any of a variety of forms and can comprise generally any known device for sensing conditions inside or outside of sensing device 100. Sensors 170 can, without limitation, take the form of acoustic sensors, accelerometers, light sensors, range finders, thermometers, Hall effect sensors, switches such as 2-way, 4-way switch, a 6-way switch, an 8-way switch, mouse and trackball systems, a joystick system, a voice recognition system, a video based gesture recognition system or other such systems, radio frequency identification and near field communication sensors, bar code sensors, position sensors and other sensors known in the art that can be used to detect conditions that may be useful to in governing operation or performing functions of image sensor convert this information into a form that can be used by processor 130 in governing operation of touch sensitive device 100. Sensors 170 can also include biometric sensors adapted to detect characteristics of a user for security and affective imaging purposes.

Alternatively or additionally, sensors 170 can include accelerometers, vibration sensors, ultrasonic sensors, piezoelectric devices or other known circuits and systems that can sense vibrations or sounds that are indicative of contact between indicator 124 and touch sensitive surface 112.

Sensors 170 can also include pressure sensors that can sense an amount of pressure applied by indicator 124 against touch sensitive surface 112. In some embodiments of this type touch sensitive surface 112 can be of a type that can sense not only which portion of touch sensitive surface 112 has been contacted by indicator 124 but the amount of pressure applied against touch sensitive surface. Various technologies of this type are known examples of which include, but are not limited to graphics tablets sold under the Wacom brand by Wacom Co., Ltd., Kazo, Saitama, Japan and that are presently capable of sensing 1024 different levels of pressure.

In still other embodiments, sensors 170 can include one or more force sensors 172 incorporated in or on indicator 124 that can sense conditions indicative of an amount of force applied between indicator 124 and touch sensitive surface 112. In such embodiments, a force sensor 170 can take the form of, for example and without limitation, a piezoelectric sensor, a stress sensor, a strain sensor, a compression sensor, a deflection sensor, or resiliently biased sensing system that can sense force based on an extent of deflection movement of a contact surface against the force of the resilient member and that can generate a signal that is indicative of the amount of force applied by or through an indicator against touch sensitive surface 112.

Such a force sensor 172 can be directly connected to interface unit 210 by way of a wired connection or a wireless connection such as by an optional wireless communication module 182 that is capable of communication with communication system 180.

In further embodiments, force sensing can be achieved by providing an indicator 124 that may in some embodiments have a rounded flexible tip such as a rubber or metallic mesh tip that are arranged in a resilient manner to flatten when pressed against touch sensitive surface 112 increasing the amount of surface area in contact with touch sensitive surface 112. In such embodiments, the size of the area in contact with touch sensitive surface 112 is an effective proxy for the amount of force applied by a user against touch sensitive surface 112 and in this regard a touch sensitive surface that is capable of sensing area that is in contact with touch sensitive surface 112 can be used for this purpose. Similar results can be achieved, with proper calibration, using a fingertip or other such indicator 124.

Communication system 180 can take the form of any optical, radio frequency or other circuit or system that can convert data into a form that can be conveyed to an external device by way of an optical signal, radio frequency signal or other form of wired or wireless signal. Communication system 180 may be used for a variety of purposes including but not limited to sending and receiving instruction sets and exchanging data with remote sensors or memory systems.

As shown in FIG. 5, touch sensitive device 100 according to one embodiment of the invention may comprise an interface unit 210. Interface unit 210 may receive signals for example from touch sensing system 110, audio system 160, audio and/or sensors 170 or any components thereof and process these signals for use by processor 130 or by a signal processing unit 220 taking the form of a signal processor or signal processing circuit.

Interface unit 210 can for example be connected to outputs from touch sensing system 110, audio system 160, and sensors 170. Such outputs are often in analog form and interface unit 210 can include analog to digital converters of any known type that can convert such outputs into digital signals that can be used by signal processing unit 220 or processor 150 and will incorporate analog to digital converters, which can take any form known in the art. Interface unit 210 may also include amplifiers, filters, including but not limited to noise filters, band pass/band reject filters or couplings, breakers, fusible links or other systems that protect other components of touch sensitive system 100 from potential damage.

Interface unit 210 according to one embodiment of the invention may perform a function of interfacing with audio sensor 162 and sensors 170 to sense a sound or vibration generated when indicator 124 contacts touch sensitive surface 112, or, in other embodiments, other specific parts (i.e., the exterior parts) of touch input sensing device 100.

Our approach can utilize both sources of vibro-acoustic signal with one or more sensors (e.g., one for in-air acoustics, and one for mechanical vibrations, also referred to as structural acoustics). Several sensor types can be used including but not limited to:

Piezoelectric bender elements
Piezoelectric film
Accelerometers (e.g., linear variable differential transformer (LVDT), Potentiometric, Variable Reluctance, Piezoelectric, Piezoresistive, Capacitive, Servo (Force Balance), MEMS)
Displacement sensors
Velocity sensors
Vibration sensors
Gyroscopes
Proximity Sensors
Electric microphones
Hydrophones
Condenser microphones
Electret condenser microphones
Dynamic microphones
Ribbon microphones
Carbon microphones
Piezoelectric microphones
Fiber optic microphones
Laser microphones
Liquid microphones
MEMS microphones It may be noted that many touchscreen computing devices today already have microphones and accelerometers built in (e.g., for voice and input sensing). These can be utilized without the need for additional sensors, or can work in concert with specialized sensors.

To this end, interface unit 210 may receive signals from an audio sensor 162 or a sensor 170 that can sense vibrations and prepares the signals for use by signal processor 220. In this embodiment, this takes the form of converting such signals into digital form and providing a digital signal representative of conditions sensed by audio sensor 162 and sensor 170.

Interface unit 210 may also receive signals from processor 130 and/or signal processing unit 220 and may use these signals to control operation of display system 120, audio system 140 and communication system 180. In this regard, interface unit 210 may include display drivers, audio output systems including amplifiers and the like. It will be appreciated that some or all of the functions ascribed to interface unit 210 may be performed by hardware or programs that are integrated within touch audio system 160, sensors 170 or communication system 180.

Signal processing unit 220 receives signals from interface unit 210 that may be in digital form and prepares the signals for further processing. Signal processing unit 220 may perform at least one of sampling, quantization and encoding processes to convert such analog signals into a digital signal.

Signal processing unit 220 may transmit the digital signals to processor 130 or determination unit 230.

In this embodiment determination unit 230, an event determining unit 250, and a database 260 are also provided. According to one embodiment of the invention, at least some of functions of interface unit 210, signal processing unit 220, signal determination unit 230, event determining unit 250, and database 260, may be program modules to control or communicate with other commonly known hardware components or components for executing software, which are included for example in touch sensitive device 100 including for example and without limitation processor 130, memory system 140, interface unit 210 and in some embodiments signal processing unit 220. The program modules may be included in touch sensitive device 100 in the form of operating systems, application program modules or other program modules, while they may be physically stored in a variety of commonly known storage devices. Further the program modules may be stored in a remote storage device that may communicate with touch sensitive device 100 by way of communication system 180. Meanwhile, such program modules may include, but are not limited to, routines subroutines, programs, objects, components, data structures and the like for performing specific tasks or executing specific abstract data types as described below in accordance with the present invention. Such programming modules may also be expressed in terms of configurations of hardware adapted to perform the functions associated with such modules.

Determination unit 230 according to one embodiment of the invention may analyze the digital signals transmitted from the signal processing unit 220 to identify and characterize the trajectory of strokes that are made on touch sensitive screen 112. Such characterization typically includes identification of the size, shape, x,y location track and time over which the stroke was formed. Optionally determination unit 230 can further identify the type of indicator 124 brought into contact with touch sensitive screen 112. Further, in some embodiments determination unit 230 can determine the pressure applied by indicator 124 against touch sensitive surface 130.

In general when determination unit 230 characterizes a stroke, the stroke is represented as a series of x,y coordinate values each representing the location of contact at a time of sensing. As is known in the art, obtaining stroke trajectory information using a typical touch sensitive surface 112 involves sampling the touch sensitive surface 112 at a predetermined rate such as for example a hundred times per second. In one such embodiment, the position of indicator 124 against touch sensitive surface 112, if any, is sensed one hundred times per second and an x-coordinate value and a y-coordinate value indicative a position of contact between indicator 124 and touch sensitive surface 112 is determined. Since the sampling occurs at uniform time intervals, the velocity of the stroke is proportional to the distance traveled between samples and the physical or spatial distance that indicator 124 travels between samples is proportionally larger where the velocity of the stroke is fast and proportionally smaller where the velocity of the stroke is slow. The x,y coordinate data and time data may be stored, sampled, filtered or processed in a variety of ways.

In the embodiment that is illustrated in FIG. 4, indicator 124 is illustrated as a stylus. This too is optional and indicator 124 can comprise any object that can be moved into contact with touch sensitive surface 112 and that can be detected thereby. In other embodiments, indicator 124 can take the form of an electronic pen, or other tools with or without electric circuits therein, which may or may not belong to the touch input sensing device 100 except when indicator 124 is a body part of the user such as the user's finger. Indicator 124 may be made of various materials such as metal, wood, plastic, rubber, and glass. When indicator 124 is the user's finger, each of the specific parts of the finger may become indicator 124 according to the present invention because fingers are usually constituted by various parts such as tips, nails, knuckles, and joints.

In general, different types of indicators 130 generate different sonic and vibrational signals when brought into contact with touch sensitive surface 112 and such differences in sonic and vibrational signals can be used to discriminate between them. For example, the tone (i.e., the shape and frequency of the wave) or tune (i.e., the frequency of the wave) of the sound/vibration generated by a touch when indicator 124 is a fingertip differs from that generated by a touch when indicator 124 is a metal stylus. Therefore, different wave data on various sounds/vibrations generated by touches from different types of indicators 130 may be pre-stored in database 260 in association with the types of the corresponding touch means and/or the parts where the corresponding touch means have touched (e.g., touch sensing system 110 or other specific parts) and utilized to implement the invention. The various wave data may be stored in database 260. However, such wave data may also be stored in the form of profile information in which the properties of the wave data are analyzed.

In some embodiments, features of the waveforms of known potential indicators 130 are characterized through mathematical analysis such as based upon a frequency of the signal, a frequency spectrum of the signal or like information. Where such an approach is used signal determination unit 230 may refer to database 260 to determine the type of indicator 124 that has generated the digital sound/vibration signal transmitted from the signal processing unit 220. Signal determination unit 230 may also determine the part of the touch sensitive device 100 where the touch has been actually applied to the extent that this had not been done already For example, determination unit 230 may determine that the touch has been actually applied to touch sensitive surface 112 by considering together the touch signal sensed by a component other than touch sensitive surface 112 such as for example and without limitation a sensor 170 arranged near touch sensitive surface 112 that can sense capacitance or changes in capacitance.

Signal determination unit 230 may also determine the amplitude of the digital sound/vibration signal transmitted from signal processing unit 220 to determine the touch intensity between indicator 124 and touch sensitive surface 112 during the stroke. The touch intensity may be determined as one of n types of intensities and may be determined based upon signals from a sensor 170 such as signals from force sensor 174 or based upon the magnitude of the amplitude of the digital sound/vibration signal during an impact. Touch intensity means the force that indicator 124 applies to a touch sensitive surface (e.g., 4 Newtons).

Features for determination include, but are not limited to, amplitude, average, Standard Deviation, Standard deviation (normalized by overall amplitude), Variance, Skewness, Kurtosis, Sum, Absolute sum, Root Mean Square (RMS), Crest Factor, Dispersion, Entropy, Power sum, Center of mass, Coefficient of variation, Cross correlation (i.e., sliding dot product), Zero-crossings, and Seasonality (i.e., cyclic variation).

Further, the above features can be computed for different representations of the sound/vibration signal, including time domain and frequency domain representations of the signal, as well as 1st, 2nd, and 3rd order derivatives of such representations, and further, filtered versions of the time domain and frequency domain representations and the 1st, 2nd, and 3rd order derivatives of such filtered versions.

Additionally, using frequency domain representations, including 1st, 2nd, and 3rd order derivatives of such representations, and further, filtered versions of the frequency domain representations and the 1st, 2nd, and 3rd order derivatives of such filtered versions, the following features can be computed: spectral centroid, spectral density, spherical harmonics, total average spectral energy, band energy ratio for every e.g., octave, and log spectral band ratios (e.g., for every pair of octaves, and every pair of thirds).

Other sound/vibration features include Cepstral Coefficients, Linear Prediction-based Cepstral Coefficients (LPCC), Perceptual Linear Prediction Cepstral Coefficients, Mel-Frequency Cepstral Coefficients (MFCC), Frequency phases (e.g., as generated by an FFT). Finally, features can also be computed from time series data derived by sliding a small window over the sound/vibration signal, including inter-window differences of the aforementioned features.

Touch intensity can be computed in two manners. For example, touch intensity may be determined as one of low, medium, and high intensities. Alternatively, the touch intensities may be determined as a continuous numerical value, for example, lying between 0.0 and 100.0. In this case, the number of types of the touch intensities is determined according to the number of criteria to distinguish the magnitude of the amplitude of the digital sound/vibration signal.

Herein, the considered amplitude of the digital sound/vibration signal may be the maximum amplitude of the signal.

Since the touch intensity determined by the signal determination unit 230 may change radically depending on indicator 124 that has applied the touch, it is necessary to predetermine the aforementioned indicator 124 type criteria in order to distinguish the magnitude of the amplitude of the digital sound/vibration signal with respect to the individual types of indicators 124.

Figure 6:
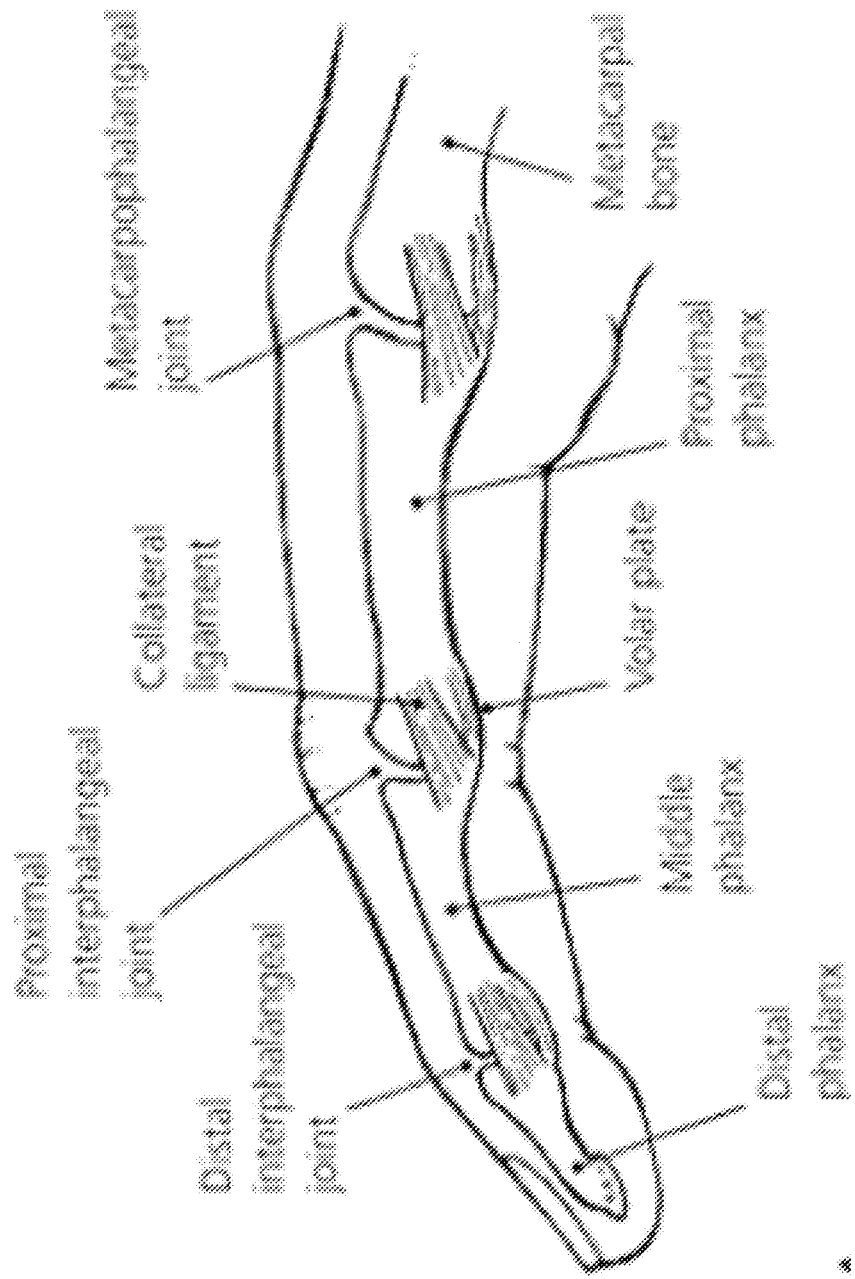
FIG. 6 shows an exemplary graph of a sound/vibration signal when a fingertip applies a touch to the touch sensitive surface.
Figure 7:
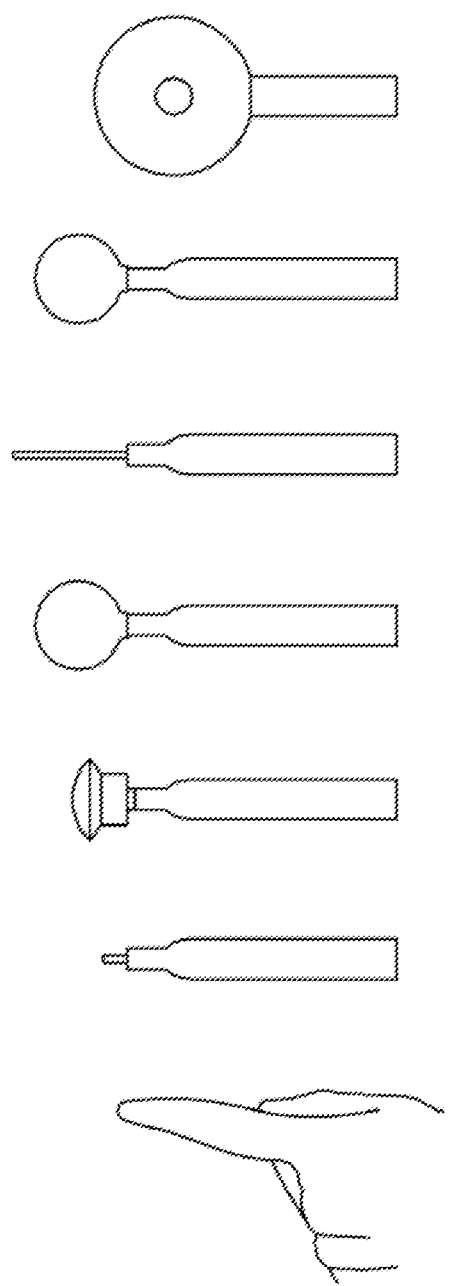
FIG. 7 shows an exemplary graph of a sound/vibration signal when touch means made of plastic applies a touch to touch sensitive surface.

This will be further discussed with reference to FIGS. 6 and 7. FIG. 6 shows an exemplary graph of a sound/vibration signal when a fingertip applies a touch to the touch sensitive surface 112. FIG. 7 shows an exemplary graph of a sound/vibration signal when touch means made of plastic applies a touch to touch sensitive surface 112. In FIG. 6, (a), (b) and (c) represent the sound/vibration signals corresponding to the low, medium and high touch intensities, respectively. Likewise, (a), (b) and (c) in FIG. 7 represent the sound/vibration signals corresponding to the low, medium and high touch intensities, respectively. As shown by way of illustration, it is preferred that the signal determination unit 230 determine the touch intensity based on the predetermined type of indicator 124, because the magnitude of the amplitude and other features of the sound/vibration signal generated by indicator 124 may become be different when indicator 124 is changed. The touch intensity can be characterized and recorded as force profile data.

Force profile data can be determined based upon the sound and vibration at initial impact between indicator 124 and touch sensitive surface 112 determined as described above from a sound/vibration signal. Additionally, force profile data can be determined across an entire stroke based upon sensed variations in an amount of force applied through indicator 130 against touch sensitive surface 112 which can be sensed in the various ways described in greater detail above and in any other know manners for sensing force applied against a surface.

Signal determination unit 230 may transmit determined stroke tracking data, data indicating the type of indicator 124 and touch intensity data to stroke continuity unit 240 as described below. Furthermore, signal determination unit 230 may transmit stroke force profile data characterizing an amount of force applied by or through indicator 124 during formation of a stroke. This can be done in one embodiment by providing force data that corresponds to each element of stroke tracking data or by sampling, mathematically processing or otherwise processing force data to characterize the amount of force applied during formation of a stroke.

As has been described in greater detail in the background, efficient operation of touch input system 100 requires tolerance for discontinuities that can arise during input of strokes. Accordingly, as is shown in the embodiment of FIGS. 4 and 5 a stroke continuity unit 240 is provided. Stroke continuity unit 240 receives stroke tracking data and determines whether two or more sequential strokes are components of an intended single stroke separated by a discontinuity, and where this is so, continuity unit 240 determines an probable stroke path and supplies tracking data representing the probable stroke path to event determining unit 250 in place of stroke tracking data for the sequential strokes.

Figure 8:
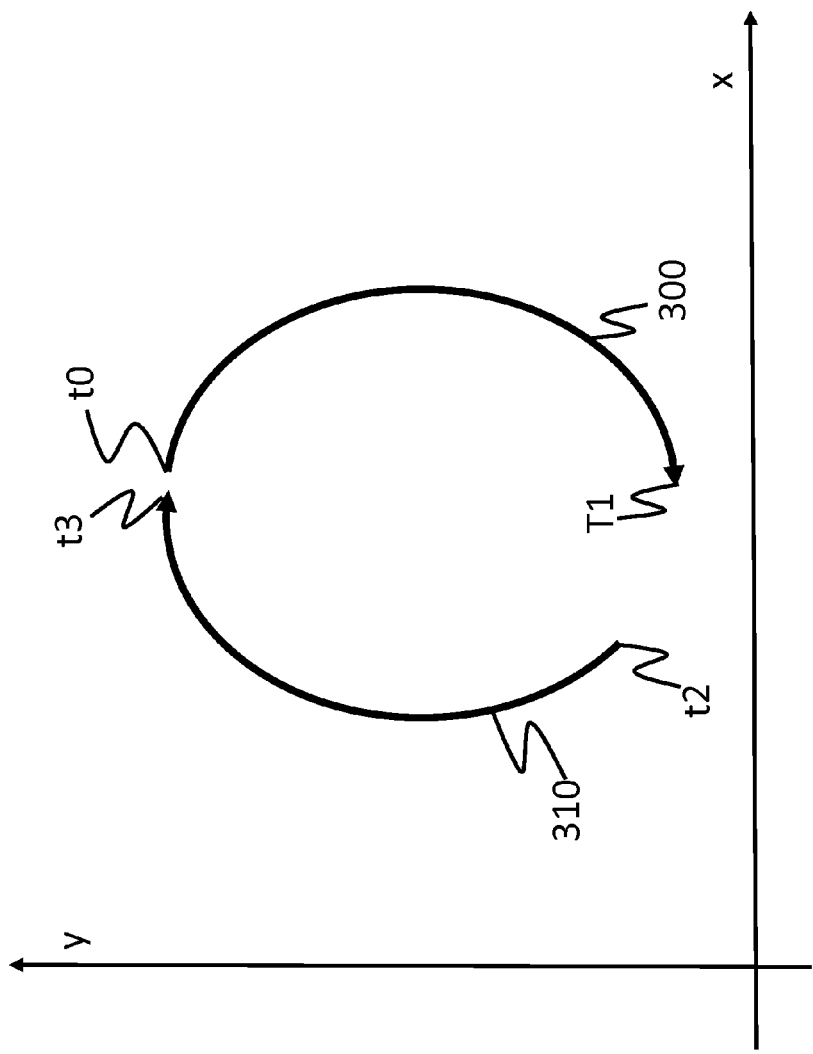
FIG. 8 illustrates an initial stroke track and a subsequent stroke track.

The operation of stroke continuity unit 240 is illustrated with reference to FIGS. 8 and 9. FIG. 8 illustrates an example of an initial stroke track 300 entered on a touch sensitive surface 112 ending at time t1 and a subsequent stroke track 310 sensed by touch sensitive surface 112 beginning a time t2. Unistroke interpretation of initial stroke track 300 may yield for example a letter J, while unistroke interpretation of a subsequent stroke track 320 may yield a letter C. However, this may not be the correct interpretation of a user's intention where a discontinuity occurs between time t1 and time t2.

In touch sensitive device 100, stroke continuity unit 240 performs a continuity analysis prior to submitting stroke track data to event determining unit 250. The continuity analysis determines whether initial stroke track 300 and subsequent stroke track 310 should be submitted to event determining unit 250 in the form of individual stroke data sets or whether initial stroke track 300 and subsequent stroke track 310 should be integrated prior to submission to stroke processing unit 260

Figure 9:
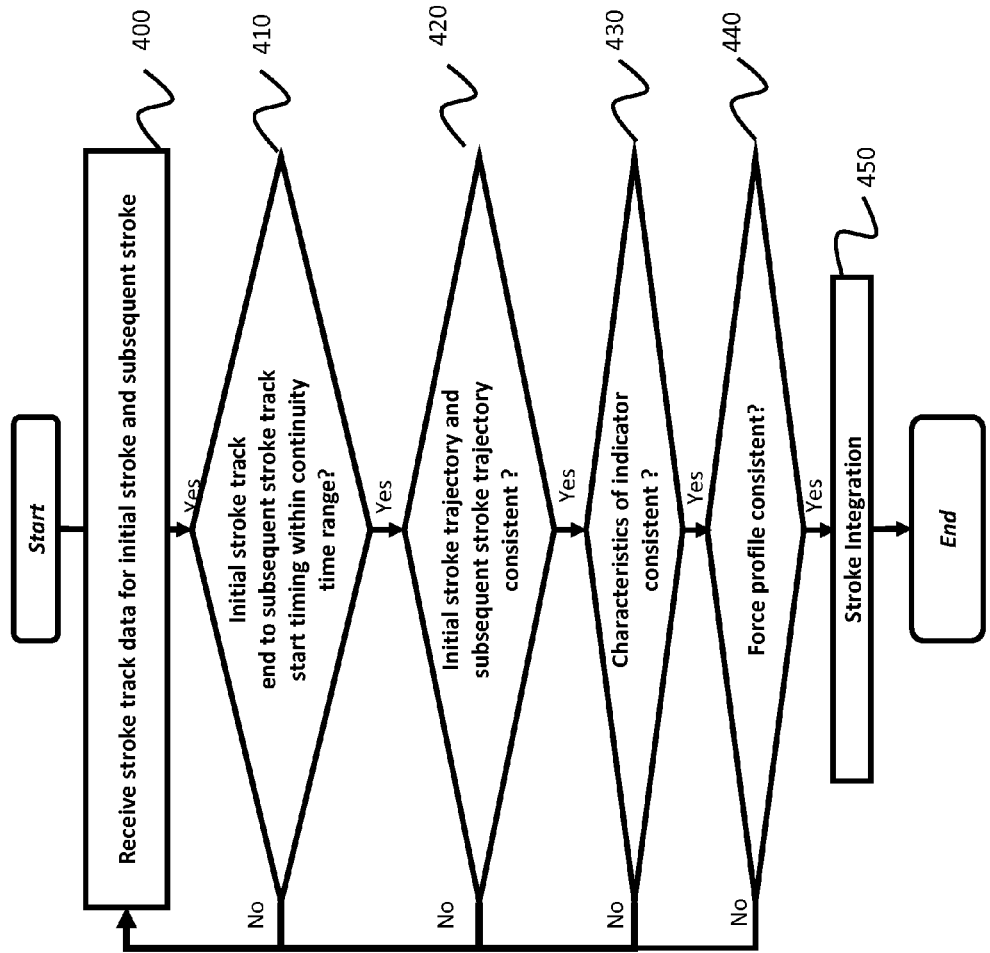
FIG. 9 illustrates a first embodiment of continuity determination method.
Figure 10:
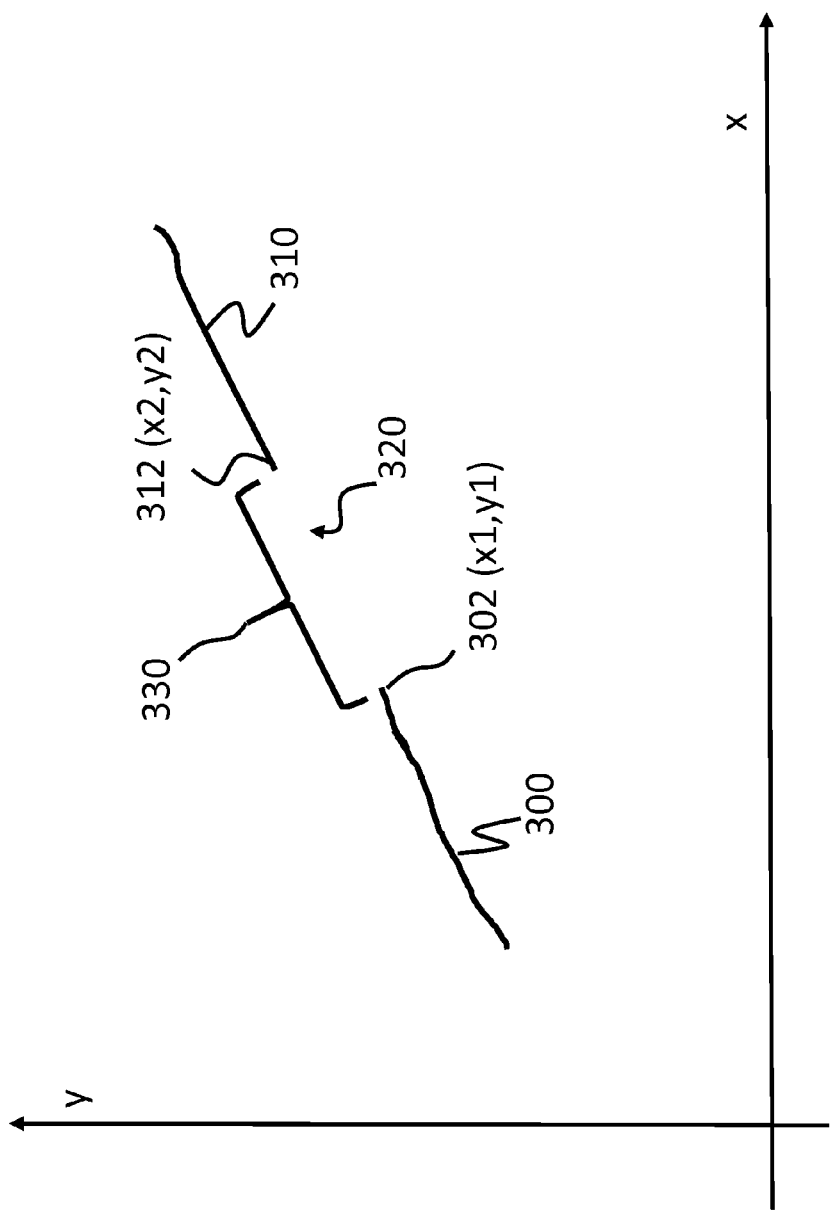
FIG. 10 shows an initial stroke track, a discontinuity, a subsequent stroke track, a minimum stroke length, an estimated stroke length and an envelope of possible discontinuity stroke paths.

FIG. 9 illustrates a first embodiment of continuity determination method. As is shown the embodiment of FIG. 9, stroke track data for an initial stroke track such as initial stroke track 300 and a subsequent stroke track 310 shown in FIG. 10 are received. Continuity determining unit 240 examines the time data associated with initial stroke track 300 and subsequent stroke track 310 (step 400). When continuity unit 240 determines that initial stroke track 300 is not followed by subsequent stroke track 310 within a continuity time range stroke continuity unit 240 passes the stroke tracking data and optionally stroke indicator type data and stroke force data for initial stroke track 300 and subsequent stroke track 310 along to event determining unit 250 for processing independent strokes.

The continuity time range can be fixed or variable. For example, in one embodiment the continuity time range can be a fixed time smaller than about 250 milliseconds. In other embodiments, the continuity time range can be any time smaller than between about 250 milliseconds to about 500 milliseconds. In other embodiments, a predetermined function can be used to calculate the time continuity range dynamically based upon a trajectory of the initial stroke track 300 or the subsequent stroke track 310. In one such embodiment, the continuity time range can be determined based upon the velocity of the initial stroke track 300, the velocity of the subsequent stroke track 310, or both. An exemplary function for determining the continuity time range can be one in which the continuity time range is at least in part inversely proportional to the velocity of initial stroke track 300, the velocity of the subsequent stroke track 310, or both. Other exemplary functions for determining the continuity time range can determine the continuity time range that is at least in part inversely proportional to an acceleration in initial stroke track 300, subsequent stroke track 310 or both. In still other embodiments, the continuity time range can be determined based upon a separation distance between the initial stroke path 300 and subsequent stroke path 310, with the predetermined function being at least in part inversely proportional to the separation distance.

However if continuity determining unit 250 determines that initial stroke track 300 was followed by subsequent stroke track 310 within the continuity time range, continuity unit 240 then determines whether initial stroke track 300 and subsequent stroke track 310 have trajectories that are consistent with a common user input action (step 410). There are a number of characteristics of the trajectories of an initial stroke 300 and subsequent stroke track 310 that are indicative of a common user input action.

In this regard it will be appreciated that where stroke tracks such as initial stroke track 300 and subsequent stroke track 310 are intentionally formed as separate strokes there may be a reduction of the velocity of an initial stroke 300 as the initial stroke track 300 reaches an end 302 such that the velocity at the beginning of a subsequent stroke 310 will be substantially different. In contrast when an initial stroke track 300 and a subsequent stroke track 310 are formed as a part of a common user input action there will typically be a relatively close correlation between the velocities at which the initial stroke track 300 and subsequent stroke track 310 are formed.

Such a relatively close correlation may comprise for example an average initial stroke velocity for the last 30% of initial stroke track 300 that is within +/−30% of an average subsequent stroke velocity for the first 30% of subsequent stroke track 310. In other embodiments the average initial stroke track velocity can be determined for a greater or lesser sized portion of initial stroke track 300 or for a greater or lesser sized portion of subsequent stroke track 300. Similarly in other embodiments the average velocity difference can be determined over a greater portion of initial stroke track 300 and subsequent stroke track 310.

Velocity and acceleration can be determined both in scalar forms and in vector forms. For example, a time rate of change of a position of contact relative to an initial position can be negative or positive along either of an x-axis or a y-axis. In some embodiments the velocity of such movements can be calculated as a simple scalar number representing total displacement per unit time regardless of direction. In such embodiments, velocities can quickly be calculated and tracked. Similarly, acceleration can be reduced to a scalar number representing a time rate of change of a velocity of total displacement. In other embodiments, scalar velocity and scalar acceleration can be determined as a rate of extension of a stroke and a rate at which the rate of extension of a stroke changes.

However, in other embodiments, velocity information is captured and maintained in a vector form with an x-axis velocity and a y-axis velocity. This provides information about the direction of the velocity as well as the rate. Similarly, acceleration can be captured in a vector form representing an x-axis acceleration and a y-axis acceleration so that a direction information about the acceleration can be determined. In other embodiments vector data can be retained in other forms such as polar coordinate forms or other forms from which direction and magnitude of a vector or an acceleration can be determined.

It is also determined whether initial stroke track 300 and subsequent stroke track 310 have trajectories that are consistent (step 420). For example, an initial stroke track 300 that defines a relatively straight line having a first slope and a subsequent stroke track 310 that defines a relatively straight line having a second slope that is within 20 degrees of the first slope and that is generally aligned with the initial stroke track can be seen as being indicative of having been made as a part of a common user input action. Another example of a situation where the initial stroke and the subsequent stroke have trajectories with paths that are consistent with a common user input action can occur when as the initial stroke track 300 has an initial curvature and the subsequent pattern has a subsequent curvature with a radius that is within 30% of a radius of initial curvature.

Physical separation between an end of initial stroke path 300 and a start of subsequent stroke path 310 also provides useful information that may be used to test For example, in as is shown in FIG. 10, an initial stroke path 300 has an end 302 having a first x,y coordinates (x1,y1) while subsequent stroke path 300 has a start 312 with x,y coordinates (x2,y2). The discontinuity stroke path may begin at x1,y1 and end at x2,y2.

Accordingly, a minimum discontinuity stroke length 330 can be determined as the square root of the sum of the difference between x1 and x2 squared and the difference between y1 and y2 squared. This minimum discontinuity stroke length can be compared to an estimated discontinuity stroke length that can be determined based upon an average or median velocity during initial stroke track 300, subsequent stroke track 310 or both multiplied by the amount of time between strokes. Where the estimated discontinuity stroke length is less than the minimum discontinuity stroke length it can be determined that, based upon the trajectory information, it is not plausible to integrate initial stroke track 300 with subsequent stroke track 310.

Also shown in the embodiment of FIG. 9 is the optional step of determining whether indicator type data for an indicator 124 used to make an initial stroke track 300 and indicator type data for an indicator 124 used to make subsequent stroke track 310 are consistent (step 430). Because, as noted above, subsequent stroke track 310 must follow initial stroke track 300 within a relatively short continuity time range, it can be presumed that it is not possible to intentionally transition from one indicator 124 to another indicator 124 within a predetermined period of time. Accordingly, where it is determined that an initial stroke track 300 made using a first type of indicator 124 is followed by a subsequent stroke track 310 that has been made by a second type of indicator 124, it can be presumed that subsequent stroke track 310 is not intended as part of a common user input action. This decision can be made based upon indicator type data.

FIG. 9 further shows the optional step of determining whether initial stroke track 300 and subsequent stroke track data 310 have a consistent force profile indicative of being part of a common user input action. Force data can be used in making this determination. For example in embodiments where force profile data associated is with initial stroke track 300 and subsequent stroke track 310 that includes impact force data characterizing impact between indicator 124 and touch sensitive surface 122 corresponding to, for example, a unique sound or vibration pattern that enables determination of an indicator type as described above. The unique sound or vibration pattern at impact can also be used to help discriminate whether an impact at a start of a subsequent stroke track 310 occurred following a lift that was inadvertent or a lift that was intentional. For example, it is unlikely that the sonic or vibrational profile of an indicator 124 intentionally impacting against touch sensitive surface 112 at the start of a planned stroke will have the same sonic or vibrational profile as the impact at a return of an indicator 124 against touch sensitive surface 112 to correct an inadvertent lift.

The sonic or vibrational profiles for these different types of impacts can be stored in, for example, memory 140 or database 260. A sonic or vibrational profile can then be compared to sensed sonic or vibrational patterns found in the start of a subsequent stroke track 312. Where a sonic or vibrational profile of an impact following an intentional lift corresponds to sensed sonic or vibrational patterns at the start of the subsequent stroke track 312 it can, in some embodiments, be determined that initial stroke track 310 and subsequent stroke track 312 are separate strokes. Conversely, where a sonic profile of an impact following an inadvertent lift corresponds to sensed sonic or vibrational patterns at the start of the subsequent stroke track 312 it can, in some embodiments, be determined that initial stroke track 310 and subsequent stroke track 312 are part of a common stroke. Further, where the sonic profile at the start of subsequent stroke track 312 is not consistent with any impact, it is possible to determine that the initial stroke and the subsequent stroke are components of a common stroke.

Force profile data other than impact data may also provide useful information that can be analyzed to help determine whether an initial stroke track 300 and subsequent stroke track 310 are part of a common user input action. For example, where stroke tracks such as initial stroke track 300 and subsequent stroke track 310 are intentionally formed as separate strokes there will frequently be a reduction of the force applied as initial stroke track 300 reaches an end such that the force applied at the beginning of a subsequent stroke 310 will be substantially different. In contrast when an initial stroke track 300 and a subsequent stroke track 310 are formed as a part of a common user input action there will typically be a relatively close correlation between the force or the profile of the force used in forming the initial stroke and in particular the force used in forming the end of the initial stroke track 300, and the force or profile of the force used in forming the subsequent stroke track 310. The force characteristics of the strokes are compared and where an amount of force applied in initial stroke track 300 is more different than an amount of force applied in forming subsequent stroke track 310 it is determined that these are separate strokes (step 440). In one embodiment, the extent of the difference can be between about 10% and 40%, in other embodiments the extent of the difference can be at least about 15%.

Where it is determined that the initial stroke track 300 and subsequent stroke track 310 are part of a common user input action, it may be useful to repeat steps 400-440 with respect to any additional stroke tracks detected following the subsequent stroke track such that if there is more than one discontinuity in a common user input action, later stroke tracks will be considered as if they are part of a common user input action.

Figure 11:
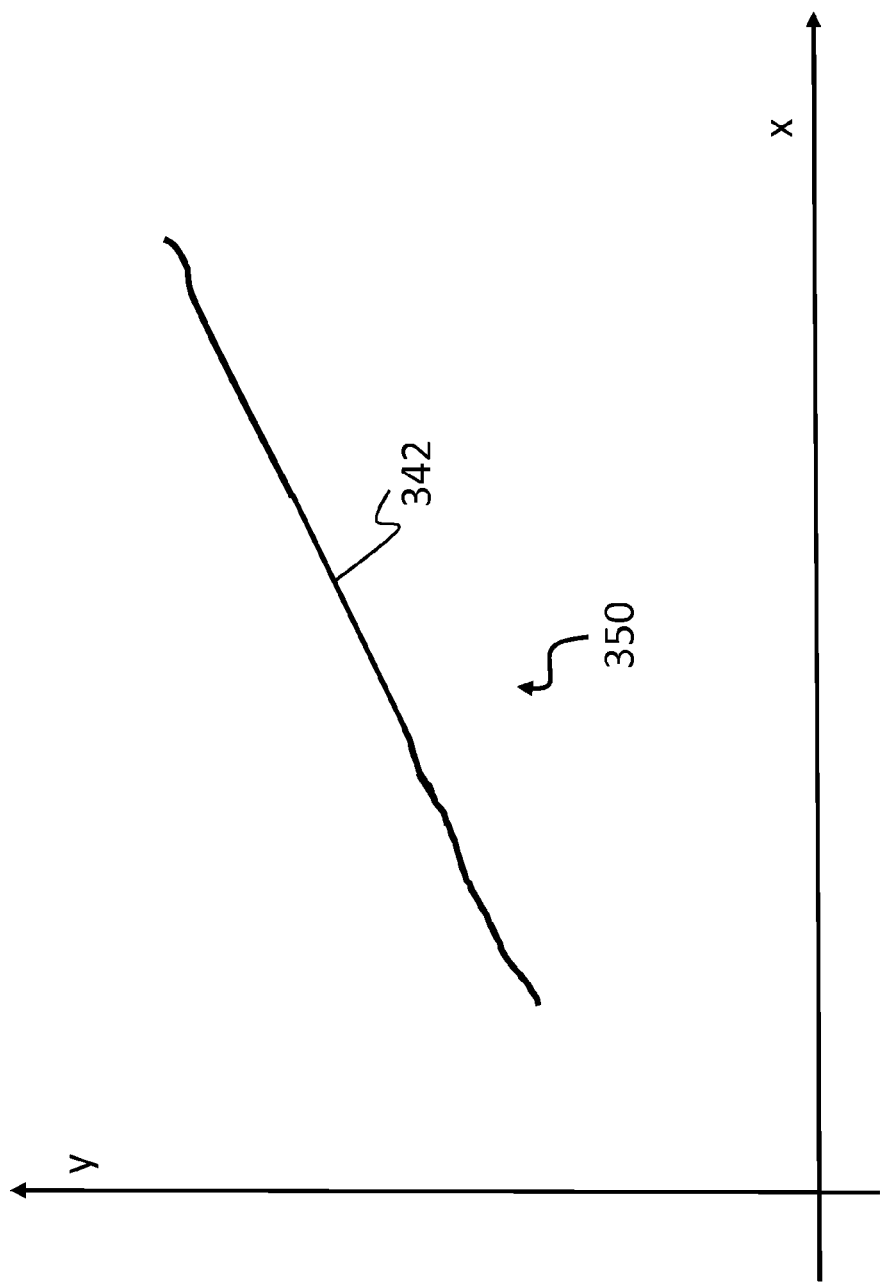
FIG. 11 shows an example of a composite stroke track.

Once the strokes tracks that are formed as a part of a common user input action are determined, processor 130 can perform the additional step of stroke integration 450. In this step, initial stroke track 300 and subsequent stroke track 310 are integrated into an integrated stroke track 350 as shown in FIG. 10 and integrated stroke track 350 is given a unique identifier, integrated x,y tracking data and timing information and the integrated stroke track is communicated to event determining unit. In this embodiment, the discontinuity 320 is left in the composite stroke and optionally metadata is generated from event determining unit 250 that a discontinuity exists in the composite stroke. This allows the event determining unit 250 to apply event determining processes to the composite stroke track on the presumption that the composite slope track represents a unified user input action with a small discontinuity therein. It will be appreciated that in forming such a composite stroke the x,y data for initial stroke path 300 and subsequent stroke path 310 will have been determined relative to the same x,y coordinate system. Accordingly, it becomes possible to, with reference to this coordinate system, determine relative sizes and positional relationships between initial stroke path 300 and subsequent stroke path 310 allowing the creation of an integrated stroke track 350 as illustrated in FIG. 11.

In other embodiments, stroke integration step 450 may, in addition to integrating initial stroke track 300 and subsequent stroke track 310, determine a discontinuity correction track to replace any stroke track data lost due to any discontinuity. Such a discontinuity correction track determination may begin with a determination of an estimated discontinuity stroke length 330 representing an estimated length of track lost due to the discontinuity 320. This estimate may be based upon a discontinuity stroke velocity. The discount stroke velocity between initial stroke track 300 and subsequent stroke 310 can be based at least in part upon one of an initial stroke velocity of at least a part of initial stroke track 300 and a subsequent stroke velocity of at least a part of subsequent stroke track 310. The discontinuity stroke velocity may be, for example, an average stroke velocity during initial stroke track 300 and subsequent stroke track 310 and the elapsed amount of time between the end of initial stroke track 300 and the start of subsequent stroke track 310. However, discontinuity stroke velocity may be based upon the velocities in other portions of the initial stroke track 300 and the subsequent stroke track 310. The determined estimated discontinuity stroke length provides a first constraint defining the discontinuity stroke track. In certain embodiments, a determination of the estimated discontinuity stroke length can be based upon at least one of an acceleration of the initial stroke, an acceleration of the subsequent stroke, a trajectory of the initial stroke and a trajectory of the subsequent stroke.

The discontinuity stroke path is also constrained by the x,y coordinates of an end of initial stroke path 300 and the x,y coordinates of a start of a subsequent stroke path 310. As is noted above and as is shown in FIG. 10, an initial stroke path 300 has an end 302 having a first x,y coordinates (x1,y1) while subsequent stroke path 300 has a start 312 with x,y coordinates (x2,y2). The discontinuity stroke path may begin at x1,y1 and end at x2,y2.

Accordingly, as noted above a minimum discontinuity stroke length 330 can be determined as the square root of the sum of the difference between x1 and x2 squared and the difference between y1 and y2 squared. In one embodiment the comparison of the estimated discontinuity stroke length and the minimum stroke length can be used to determine a discontinuity stroke track 342. For example where the estimated discontinuity stroke length is within for example 30% of the minimum discontinuity stoke length 330 a minimum discontinuity stroke track 342 can be approximated by a line between end 302 of initial stroke track 300 and start 312 of subsequent stroke track 310 as is illustrated in FIG. 11 to yield an integrated stroke track 350 which may be passed to event determining unit 260 for further processing along with any indicator type data and force data.

Figure 12:
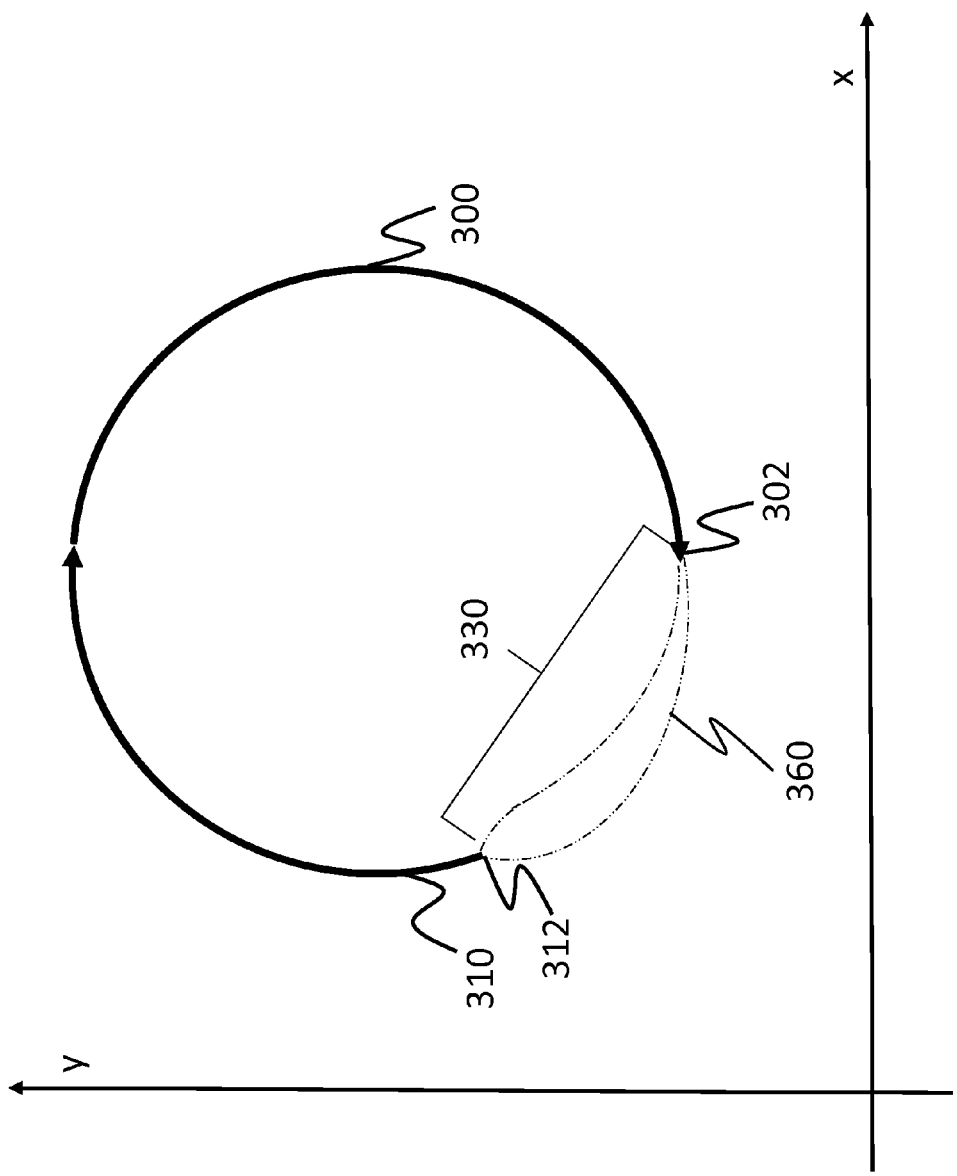
FIG. 12 shows an initial stroke track, a discontinuity, a subsequent stroke track, a minimum stroke length, an estimated stroke length and an envelope of possible discontinuity stroke paths.
Figure 13:
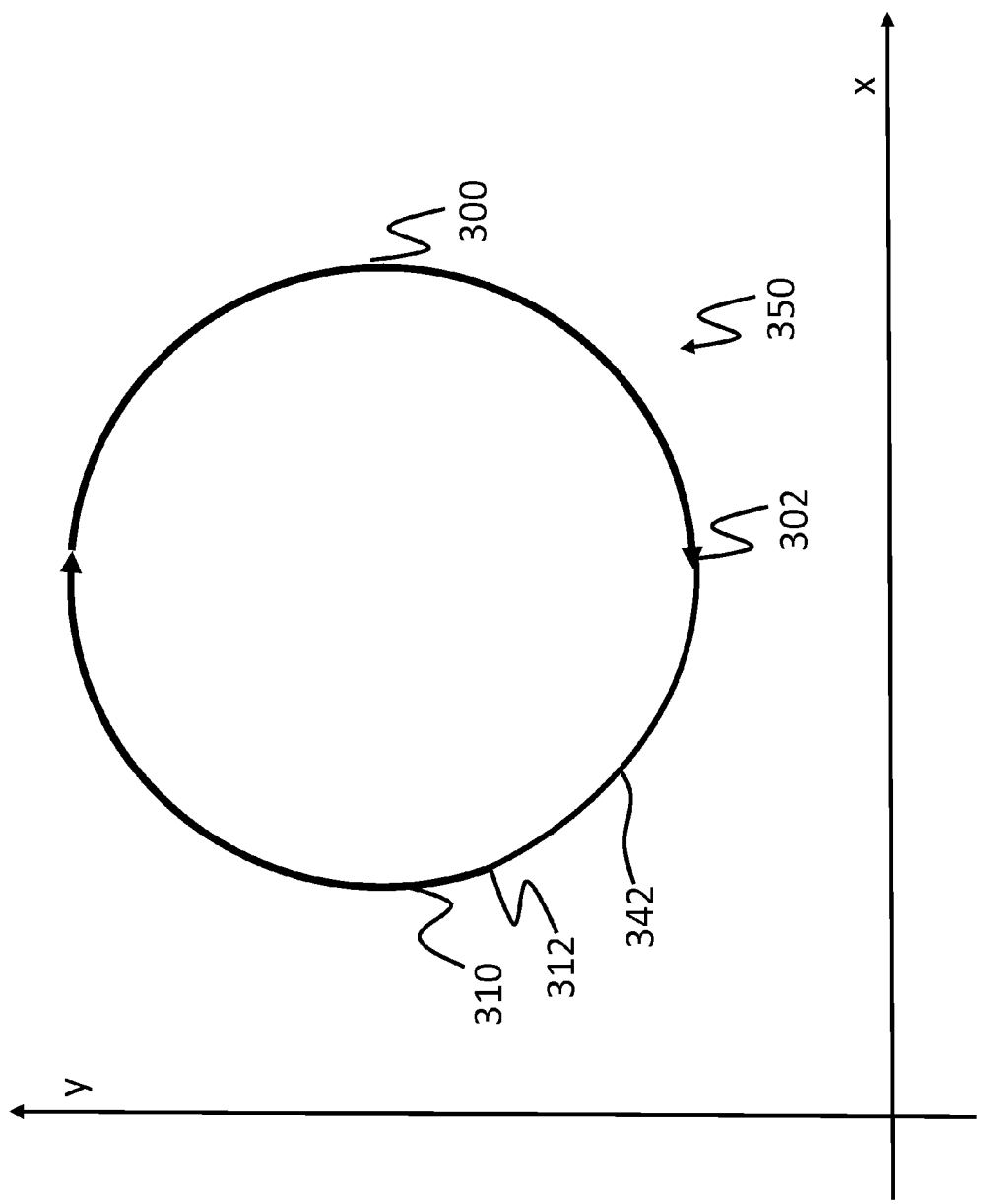
FIG. 13 shows an example of a composite discontinuity stroke track.

In other circumstances as illustrated in FIG. 12 there may be a more significant difference between a minimum discontinuity stroke length 330 and the estimated discontinuity stroke length. In such cases characteristics of initial stroke track 300 and subsequent stroke track 310 can be examined to identify possible stroke path curvatures for discontinuity stroke length 330. Here too because of the limited amount of time in which a discontinuity has occurred there is a limited envelope 360 of possible discontinuity stroke paths between end 302 of initial stroke track 300 and start 312 of subsequent stroke track 310. In such an embodiment, it may be useful to consider information from a trajectory of the initial stroke 300 and a trajectory of the subsequent stroke 310 In one embodiment of this type a curvilinear interpolation may be useful to determine a probable track path between initial stroke track 300 having the trajectory shown and subsequent stroke track 310 having the trajectory shown and to assemble a discontinuity stroke track 342 as shown in FIG. 13 which may be sent to event determining unit 250 along with any indicator type data and force data.

Figure 14:
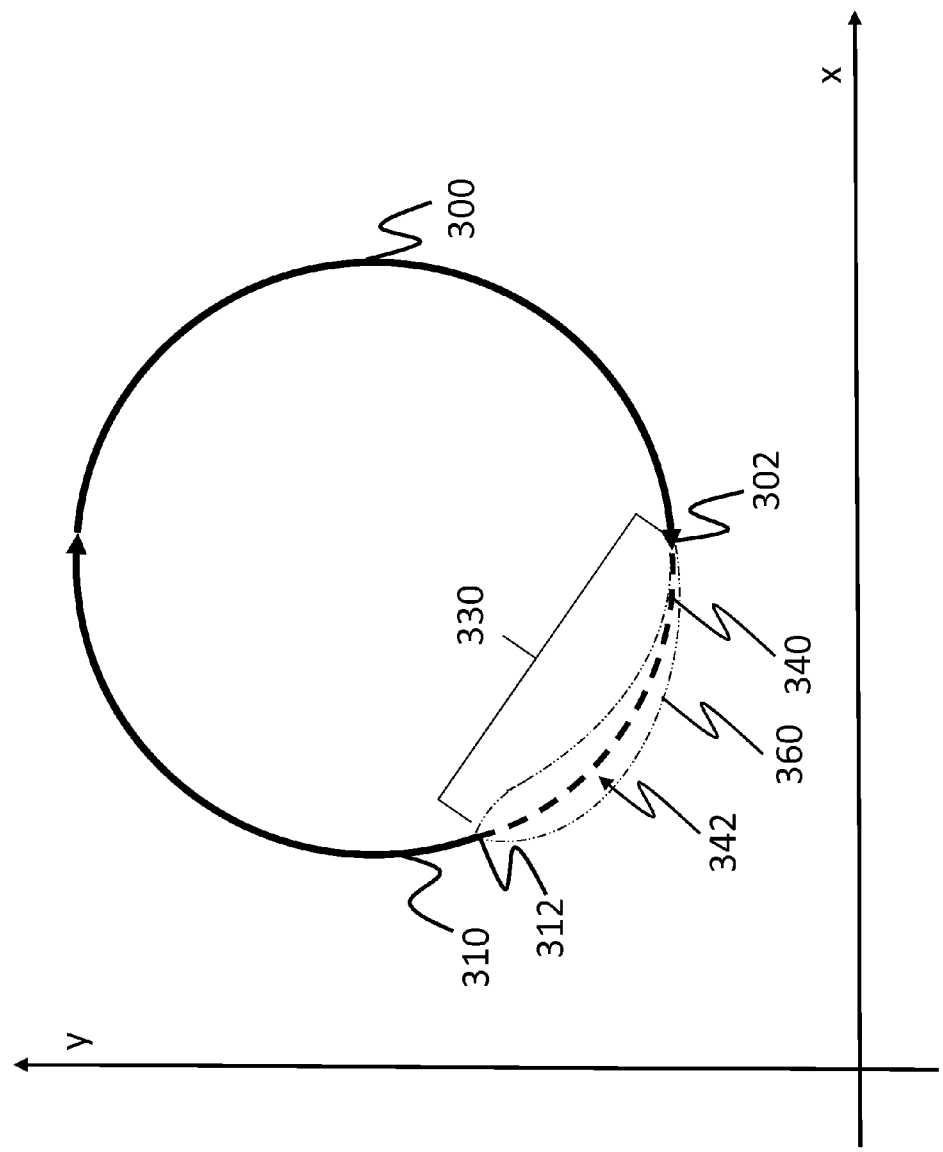
FIG. 14 shows an example of a forward projection used to create a discontinuity stroke path.

As is shown in FIG. 14, in other embodiments a discontinuity stroke track 342 may be determined by defining a forward projection 340 extending from an end 302 and an initial stroke path 300 into a discontinuity such as discontinuity 330. In this embodiment, vector velocity and acceleration information is determined for initial stroke path 300. Direction and magnitude information from the vector velocity and acceleration for initial stroke path 300 is then used for determining a trajectory of forward projection 340. This allows greater confidence and greater reliability the trajectory selected for forward projection 340. For example, in embodiments such as the one that is illustrated in FIG. 14, a forward projection 340 from end 302 can be made using vector based velocity and acceleration information associated with initial stroke track 300 such as a last 30% of initial stroke track 300. In this example, when forward projection 340 is defined by the vector based velocity and acceleration and is extended by the estimated discontinuity stroke length, forward projection 340 extends from end 302 of curved initial stroke track 300 to start 312 of subsequent stroke track 310. Where this occurs, forward projection 340 can be used as discontinuity stroke track 342.

Figure 15:
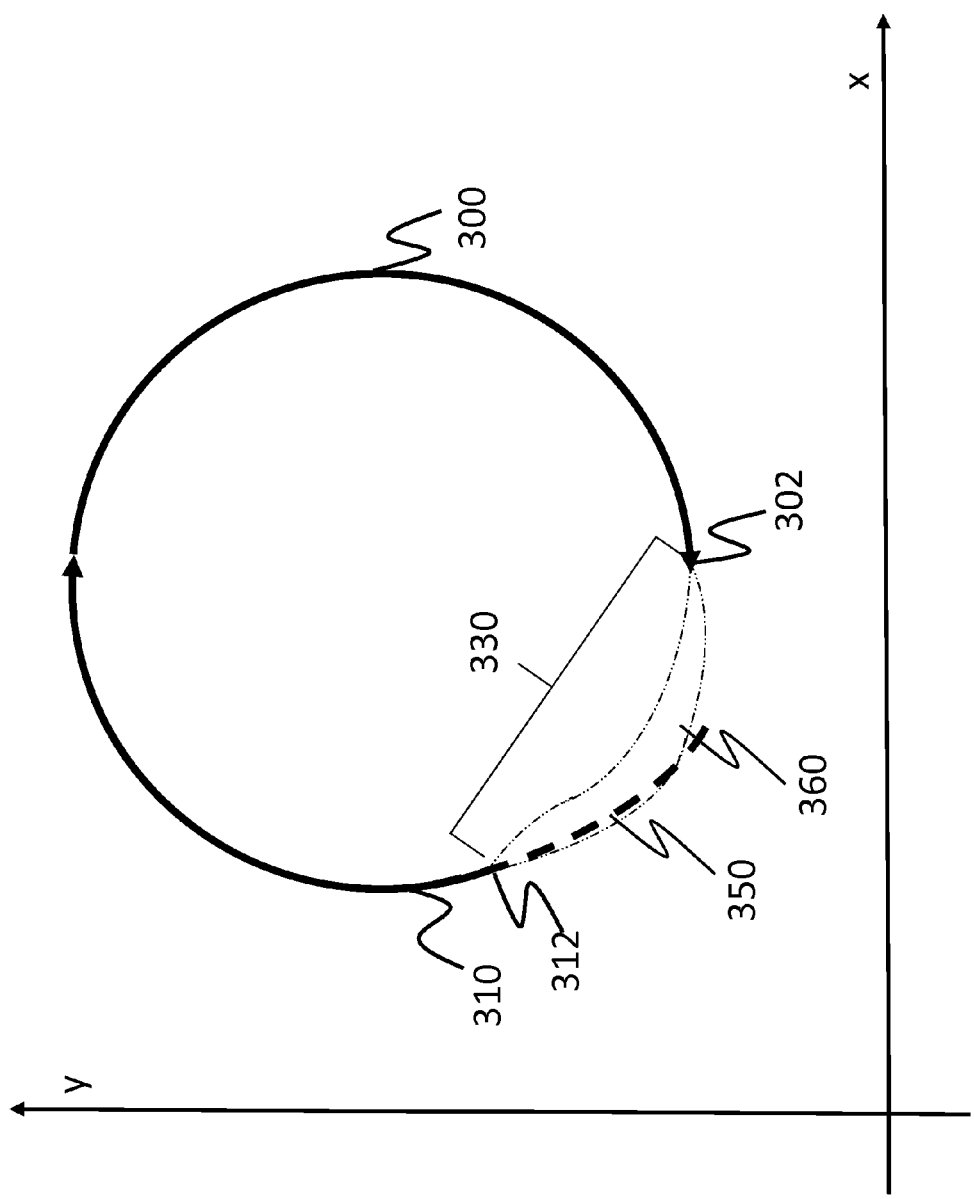
FIG. 15 shows an example of a rearward projection.

As is shown in FIG. 15, in other embodiments a discontinuity stroke track 342 may be determined by defining a rearward projection 350 extending from a start 312 of subsequent stroke path 310 into a discontinuity such as discontinuity 330. In this embodiment, vector velocity and acceleration information is determined for initial stroke path 300. Direction and magnitude information from the vector velocity and acceleration for initial stroke path 300 is then used for determining a trajectory of rearward projection 350. This allows greater confidence and greater reliability the trajectory selected for rearward projection 350. For example, in embodiments such as the one that is illustrated in FIG. 15, a rearward projection 350 from start 312 can be made using vector based velocity and acceleration information associated with subsequent stroke track 310 such as an initial 30% of subsequent stroke track 300. In some cases, when rearward projection 350 is defined by the vector based velocity and acceleration and is extended by the estimated discontinuity stroke length, rearward projection 340 extends from start 312 of subsequent stroke track 310 to end 302 of subsequent stroke track 310. Where this occurs, forward projection 340 can be used as discontinuity stroke track 342.

However such confidence is not absolute. As shown in FIG. 15 extending a rearward projection 350 along a trajectory defined by a vector based acceleration and velocity of subsequent stroke track 310 causes the stroke track to pass outside of envelope 360. Where this occurs, further rearward extension of subsequent stroke track 310 is not predictive of a reliable discontinuity stroke track. Where either of a forward projection 340 from an initial stroke track 300 or a rearward projection from a subsequent stroke track 310 follows a track that is not within envelope 360 or otherwise do not travel along a trajectory that closes the discontinuity 330 other approaches may be used. For example, rearward projection 350 and forward projection 340 can be combined to determine a discontinuity stroke track 342.

Figure 16:
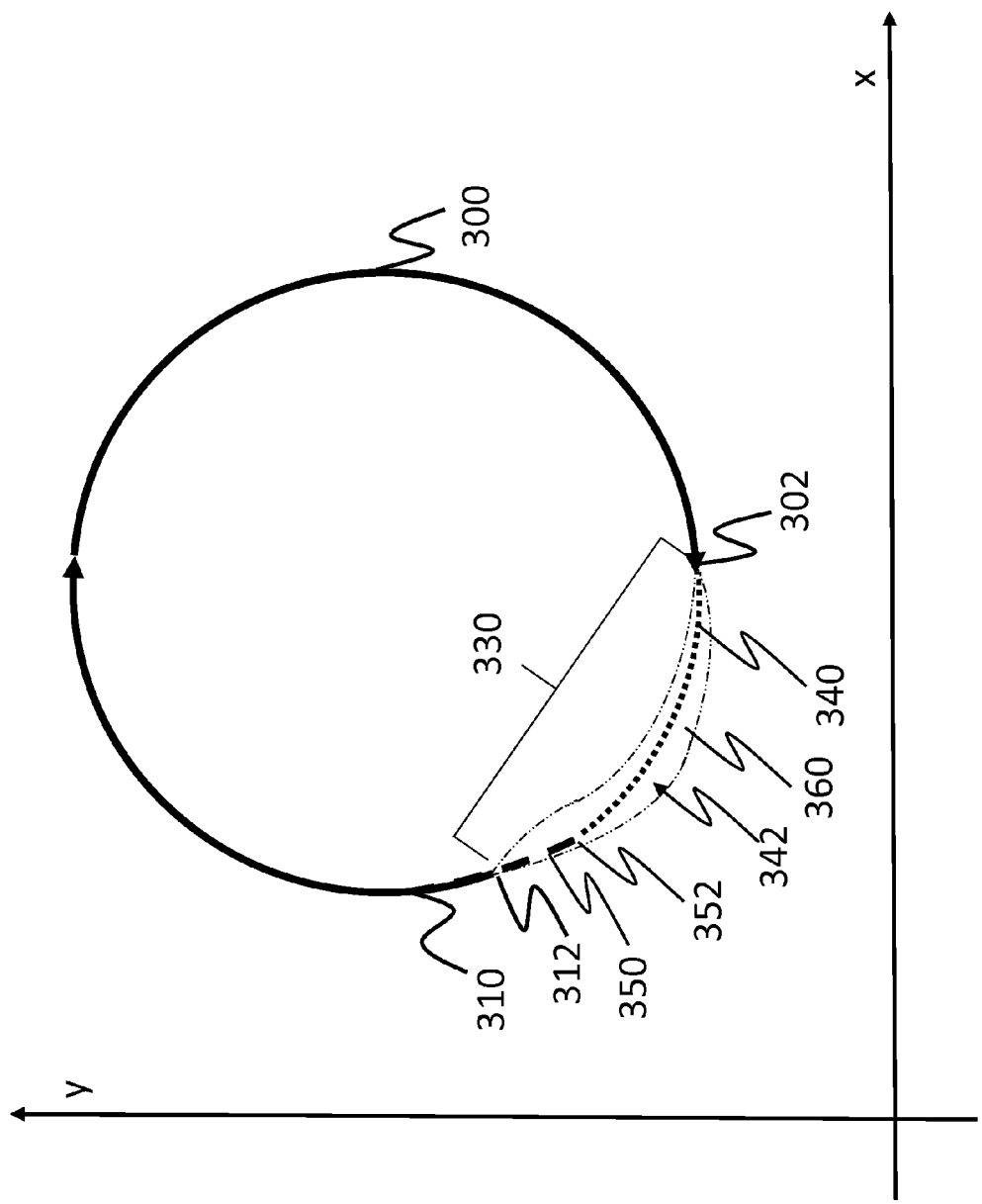
FIG. 16 shows an example of a forward projection and a rearward projection used to determine a discontinuity stroke path.

One example of this is illustrated in FIG. 16 in which for example it is found that extending rearward projection 350 and forward projection 340 leads to an intersection 352 of rearward projection 350 and forward projection 340 within envelope 360. In this example, discontinuity stroke track 342 follows forward projection 340 extending to intersection 352 and then follows rearward stroke projection 350 from projection 352 to start 312 of subsequent stroke track 310. It will be appreciated that using forward projection 340 and rearward projection 350 it becomes possible to substantially reduce the size of discontinuity 330 such that even when forward projection 340 and rearward projection 350 cannot be combined in a manner that is reliably predictive of a user input action, a set of possible discontinuity stroke paths that may occur within the constraints of a reduced size discontinuity is greatly reduced.

Accordingly, in embodiments where acceleration and velocity having both directional information and magnitude information are used together, it becomes possible to forward project or rear project a trajectory into a discontinuity with greater reliability.

In embodiments where event determining unit 250 seeks to determine whether an initial stroke track 300 and a subsequent stroke track 310 separated by having a discontinuity is one of a limited number of predetermined stroke patterns, the estimated stroke length can be determined and an integrated stroke track can be generated based upon the number of predetermined stroke patterns that corresponds to the initial stroke track 300, the subsequent stoke path 310 while also providing a path from an end of the initial stroke track 300 to a start of subsequent stroke track 310 that has a path length that is closest to the estimated discontinuity track length.

Event determining unit 250 may perform a function to generate a prearranged event according to one embodiment of the invention. Different events may be generated corresponding to integrated stroke track data and, optionally, the specific types of indicator 124 and the specific touch intensities, or other information associated with the stroke track data. The particular events generated can be predetermined or set up by the user using application programs executed on the touch input sensing device 100 or fixedly set up at the touch input sensing unit 100.

It will be understood that the processes described herein can be implemented in a serial fashion. For example, after determining that initial stroke track 300, subsequent stroke track 310 and a discontinuity stroke track 342 are to be form an integrated stroke track 350 as shown in FIG. 11, integrated stroke track 350 can be considered to be an initial stroke track 300 and steps such as steps 400 to 450 can be repeated to determine whether integrated stroke track 350 and a subsequent stroke track (not shown) are part of a common user input action. If so, another integrated stroke track (not shown) can be formed and these steps 400 to 450 can be repeated with another subsequent stroke track (if any) with interations of these cycles repeating until it is determined that a subsequent stroke (if any) is not part of a common user input action with the integrated stroke track assembled in this fashion.

Therefore, in accordance with the present invention, a user may experience a variety of different events according to the types of indicator 124 and the corresponding touch intensities even when the user touches the same part of his/her touch input sensing device 100. Examples of such events may include selecting, magnifying, editing, removing, forwarding, playing audio, and playing video of the object corresponding to the touch, among the visual objects displayed on the touch input unit 110.

Stroke track data, and data characterizing different impact profiles for different types of indicators against touch sensitive surface 112 and any other data as described above may be stored in database 260 according to one embodiment of the invention. Although FIG. 4 shows that database 260 is incorporated in touch sensitive device 100, database 260 may be configured separately from touch sensitive device 100 as needed by those skilled in the art to implement the invention. Database 260 may be stored using memory system 140 or using a local or remote computer readable medium or device and may refer not only to a database in a narrow sense but also to a database in a broad sense including data records based on a file system or the like. Database 260 according to the present invention may be even a collection of simple logs if one can search and retrieve data from the collection.

Lastly, processor 130 according to one embodiment of the invention may perform a function to control data flow among signal sensing unit 210, signal processing unit 220, signal determination unit 230, stroke continuity unit 240, event determining unit 250 and database 260. That is, processor 130 may control data flow among the components of touch sensitive device 100 such as interface unit 210, signal processing unit 220, signal determination unit 230, event determining unit 250 and database 260 may carry out their particular functions, respectively. Additionally, any or all of the functions ascribed herein to as interface unit 210, signal processing unit 220, signal determination unit 230, stroke continuity unit 240, event determining unit 250 and database 260 may be performed by processor 130.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as optical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described above in connection with specific limitations such as detailed components as well as limited embodiments and drawings, these are merely provided to aid general understanding of the invention. The present invention is not limited to the above embodiments, and those skilled in the art will appreciate that various changes and modifications are possible from the above description.

Therefore, the spirit of the present invention shall not be limited to the embodiments described above, and the entire scope of the appended claims and their equivalents will fall within the scope and spirit of the invention.

What is claimed is:

1. A system for determining a user input action comprising:
   a sensor configured to sense an initial stroke track representing an initial movement of a user controlled indicator against a touch sensitive surface and to sense a subsequent stroke track representing subsequent movement of the user controlled indicator against the touch sensitive surface, wherein said sensing of the initial stroke track and said sensing of the subsequent stroke track are separated by a discontinuity, wherein the discontinuity starts at an end of the initial stroke track and ends at a beginning of the subsequent stroke track; and
   a processor configured to determine whether the initial stroke track and the subsequent stroke track comprise portions of one user input action or two separate user input actions, wherein the portions of one user input action are determined when the initial stroke track is followed by the subsequent stroke track within a continuity time range and a trajectory of the initial stroke track is consistent with a trajectory of the subsequent stroke track, otherwise, the two separate user input actions are determined, wherein there is a reduction of a stroke velocity at the end of the initial stroke track as compared to a stroke velocity at the beginning of the subsequent stroke track when the processor determines that there are two separate user input actions.

2. The system of claim 1, wherein the trajectory of the initial stroke track is consistent with the trajectory of the subsequent stroke track when the initial stroke track has a stroke velocity that is within 30% of a stroke velocity of the subsequent stroke track.

3. The system of claim 1, wherein the trajectory of the initial stroke track is consistent with the trajectory of the subsequent stroke track when the initial stroke track has an initial curvature and the subsequent stroke track has a subsequent curvature with a radius that is within 30% of a radius of initial curvature.

4. The system of claim 1, further comprising a sensor configured to sense impact between the user controlled indicator and the touch sensitive surface, to provide impact data representative of the sensed impact to the processor, and wherein the processor is further configured to determine that the initial stroke track and the subsequent stroke track do not comprise portions of the one user input action when the processor determines that there has been an impact at the start of the subsequent stroke track that is consistent with an impact after an intentional lift of the user controlled indicator from the touch sensitive surface.

5. The system of claim 1, further comprising a sensor configured to sense impact between the user controlled indicator and the touch sensitive surface, to provide impact data representative of the sensed impact to the processor, and wherein the processor is further configured to determine that the initial stroke track and the subsequent stroke track do not comprise portions of the one user input action when the processor determines that there has been an impact at a start of the subsequent stroke track.

6. The system of claim 1, wherein the trajectory of the initial stroke track is consistent with the trajectory of the subsequent stroke track when an average stroke velocity of the initial stroke track is within 30% of an average stroke velocity of the subsequent stroke track.

7. The system of claim 1, wherein the trajectory of the initial stroke track is consistent with the trajectory of the subsequent stroke track when an average initial stroke velocity for the last 30% of the initial stroke track that is within 30% of an average subsequent stroke velocity for the first 30% of the subsequent stroke track.

8. The system of claim 1, further comprising a force sensor capable of sensing conditions that are indicative of force applied by a stylus against the touch sensitive surface during a stroke, wherein the processor is further configured to determine that the subsequent stroke track and the initial stroke track do not comprise portions of the one user input action when the processor determines that an impact force profile sensed by the force sensor at a start of the subsequent stroke track is consistent with a force profile of an impact that arises when a user brings the user controlled indicator against the touch sensitive surface after an intentional lift.

9. The system of claim 8, wherein the force sensor comprises at least one of a microphone, a sound sensor, a vibration sensor, a piezoelectric sensor, a stress sensor, a strain sensor, a deflection sensor, a compression sensor, and a resiliently biased sensing system that can sense force based on an extent of deflection movement of a contact surface against the force of the resilient member and that can generate a signal that is indicative of the amount of force applied by or through the user controlled indicator against the touch sensitive surface.

10. The system of claim 8, wherein the force sensor comprises rounded resiliently flexible tip of the user controlled indicator that flatten when pressed against touch sensitive surface increasing the amount of surface area in contact with touch sensitive surface as a function of the amount of force applied through the tip and wherein the processor determines an amount of force applied by the user controlled indicator against the touch sensitive surface based upon the surface area of the user controlled indicator that is in contact with the touch sensitive surface.

11. The system of claim 1, wherein the processor is further configured to determine a discontinuity velocity based at least in part upon one of a stroke velocity of at least a part of the initial stroke track and a stroke velocity of at least a part of the subsequent stroke track.

12. The system of claim 11, wherein the processor is configured to determine an estimated discontinuity stroke length based upon the determined discontinuity velocity and a time between a time of an end of the initial stroke track and a time of a start of the subsequent stroke track.

13. The system of claim 12, wherein the processor is configured to determine a minimum stroke length between the end of the initial stroke track and the start of the subsequent stroke track, and determines that the initial stroke track and the subsequent stroke track are not portions of the user input action when the minimum stroke length is greater than the estimated discontinuity stroke length.

14. The system of claim 12, wherein each stroke track is one of a number of predetermined stroke patterns, wherein the estimated stroke length is determined and the processor determines a composite stroke can be generated based upon the number of predetermined stroke patterns that correspond to the initial stroke track and the subsequent stoke track while also providing a path from an end of the initial stroke track to the subsequent stroke track that has a path length closest to the estimated discontinuity stroke length.

15. The system of claim 1, wherein the processor is configured to determine an estimated discontinuity stroke length based upon at least one of an acceleration of the initial stroke, an acceleration of the subsequent stroke, a trajectory of the initial stroke and a trajectory of the subsequent stroke.

16. The system of claim 1, wherein the continuity time range is smaller than between about 100 milliseconds and 400 milliseconds.

17. The system of claim 1, wherein a predetermined function is used to calculate the time continuity range dynamically based upon the stroke trajectory.

18. The system of claim 1, wherein the continuity time range is determined based at least in part upon at least one of a stroke velocity of the initial stroke track, a stroke velocity of the subsequent stroke track, an acceleration of the initial stroke track and an acceleration of the subsequent stroke track.

19. The system of claim 1, wherein the continuity time range is determined based upon function in which the continuity time range is at least in part inversely proportional to at least one of a stroke velocity of the initial stroke track, a stroke velocity of the subsequent stroke track, an acceleration of the initial stroke track, an acceleration of the subsequent stroke track, a trajectory of the initial stroke track and a trajectory of the subsequent stroke track.

20. The system of claim 1, wherein the trajectory of the initial stroke track is determined to be consistent with a trajectory of a subsequent stroke track when an average initial stroke acceleration for the last 30% of the initial stroke track is within 30% of an average subsequent stroke acceleration for the first 30% of the subsequent stroke track.

21. The system of claim 1, wherein when it is determined that the initial stroke track and the subsequent stroke track comprise portions of the user input action, a discontinuity stroke track is determined based upon a direction and magnitude of a stroke velocity of the initial stroke track, a direction and magnitude of an acceleration of the initial stroke track, a direction and magnitude of a stroke velocity of the subsequent stroke track and direction and magnitude of an acceleration of the subsequent stroke track.

22. The system of claim 1, wherein when it is determined that the initial stroke track and the subsequent stroke track comprise portions of the user input action, a discontinuity stroke track is determined by extending forward projection from an end of the initial stroke track and wherein the forward projection follows a trajectory that is determined based upon at least one of a direction and magnitude of a stroke velocity of the initial stroke track, and a direction and magnitude of an acceleration of the initial stroke track.

23. The system of claim 1, wherein when it is determined that the initial stroke track and the subsequent stroke track comprise portions of the user input action, a discontinuity stroke track is determined by extending a rearward from a start of the subsequent stroke track and wherein the rearward projection follows a trajectory that is determined based upon at least one of a direction and magnitude of a stroke velocity of the subsequent stroke track, and a direction and magnitude of an acceleration of the subsequent stroke track.

24. A continuity determination method comprising:
sensing an initial stroke track representing an initial movement of a user controlled indicator against a touch sensitive surface and sensing a subsequent stroke track representing subsequent movement of the user controlled indicator against the touch sensitive surface, wherein said sensing of the initial stroke track and said sensing of the subsequent stroke track are separated by a discontinuity; and
determining whether the initial stroke track and the subsequent stroke track comprise portions of one user input action or two separate user input actions, wherein the portions of one user input action are determined when the initial stroke track is followed by the subsequent stroke track within a predetermined period of time and a trajectory of the initial stroke track is consistent with a trajectory of the subsequent stroke track, otherwise, the two separate user input actions are determined, wherein there is a reduction of a stroke velocity at the end of the initial stroke track as compared to a stroke velocity at the beginning of the subsequent stroke track when the processor determines that there are two separate user input actions.

25. The method of claim 24, wherein the trajectory of the initial stroke track and the trajectory of the subsequent stroke track are determined to have trajectories that are consistent with the user input action when the initial stroke track has a velocity that is within 30% of a velocity of the subsequent stroke track.

26. The method of claim 24, wherein the initial stroke track and the subsequent stroke track are determined to have trajectories that are consistent with the user input action when the initial stroke track has an initial curvature and the subsequent stroke track has a subsequent curvature with a radius that is within 30% of a radius of initial curvature.

27. The method of claim 24, further comprising sensing an impact force profile at an impact between the user controlled indicator and a touch sensitive surface and determining that the initial stroke track is not part of the user input action with the subsequent stroke track when there has been an impact at the start of the subsequent stroke track that is consistent with an impact after an intentional lift of the user controlled indicator from the touch sensitive surface.

28. The method of claim 24, further comprising sensing a force profile between the user controlled indicator and the touch sensitive surface during the subsequent stroke track and determining that the initial stroke track is not part of the user input action with the subsequent stroke track when there is an impact force profile at the start of the subsequent stroke track that is consistent with an impact that occurs after an intentional lift of the user controlled indicator from contact with the touch sensitive surface.

29. The method of claim 24, wherein the trajectory of the initial stroke track is consistent with a trajectory of a subsequent stroke track when an average stroke velocity associated with the initial stroke track is within 30% of an average stroke velocity associated with the subsequent stroke track.

30. The method of claim 24, wherein the trajectory of the initial stroke track is determined to be consistent with a trajectory of a subsequent stroke track when an average initial stroke velocity for the last 30% of the initial stroke track is within 30% of an average subsequent stroke velocity for the first 30% of the subsequent stroke track.

31. The method of claim 24, wherein the trajectory of the initial stroke track is determined to be consistent with a trajectory of a subsequent stroke track when an average initial stroke acceleration for the last 30% of the initial stroke track is within 30% of an average subsequent stroke acceleration for the first 30% of the subsequent stroke track.

32. The method of claim 24, wherein when it is determined that the initial stroke track and the subsequent stroke track comprise portions the user input action, a discontinuity stroke track is determined based upon a direction and magnitude of a stroke velocity of the initial stroke track, a direction and magnitude of an acceleration of the initial stroke track, a direction and magnitude of a stroke velocity of the subsequent stroke track and direction and magnitude of an acceleration of the subsequent stroke track.

33. The method of claim 24, wherein when it is determined that the initial stroke track and the subsequent stroke track comprise portions of the user input action, a discontinuity stroke track is determined by extending forward projection from an end of the initial stroke track and wherein the forward projection follows a trajectory that is determined based upon at least one of a direction and magnitude of a stroke velocity of the initial stroke track, and a direction and magnitude of an acceleration of the initial stroke track.

34. The method of claim 24, wherein when it is determined that the initial stroke track and the subsequent stroke track comprise portions of the user input action, a discontinuity stroke track is determined by extending a rearward from a start of the subsequent stroke track and wherein the rearward projection follows a trajectory that is determined based upon at least one of a direction and magnitude of a stroke velocity of the subsequent stroke track, and a direction and magnitude of an acceleration of the subsequent stroke track.

35. A non-transitory computer-readable recording medium having program instructions that can be executed by various computer components to perform a method comprising:

sensing an initial stroke track representing an initial movement of a user controlled indicator against a touch sensitive surface and sensing a subsequent stroke track representing subsequent movement of the user controlled indicator against the touch sensitive surface can be determined, wherein said sensing of the initial stroke track and said sensing of the subsequent stroke track are separated by a discontinuity; and determining that the initial stroke track and the subsequent stroke track comprise portions of a user input action when the initial stroke track is followed by the subsequent stroke track within a predetermined period of time and a trajectory of the initial stroke track is consistent with a trajectory of the subsequent stroke track.

* * * * *